United States Patent
Sivakumar et al.

(10) Patent No.: US 7,087,282 B2
(45) Date of Patent: Aug. 8, 2006

(54) LIMITED PLAY OPTICAL STORAGE MEDIUM, METHOD FOR MAKING THE SAME

(75) Inventors: Krishnamoorthy Sivakumar, Bangalore (IN); Philippe Schottland, Evansville, IN (US); Binod Behari Sahoo, Orissa (IN); Ganapati Subray Shankarling, Bangalore (IN); Meerakani Mohamed Ali Sait, Tamil Nadu (IN); Adil Minoo Dhalla, Maharashtra (IN)

(73) Assignee: General Electric Company, Schenectady, NY (US)

( * ) Notice: Subject to any disclaimer, the term of this patent is extended or adjusted under 35 U.S.C. 154(b) by 334 days.

(21) Appl. No.: 10/619,642

(22) Filed: Jul. 15, 2003

(65) Prior Publication Data

US 2005/0013232 A1 Jan. 20, 2005

(51) Int. Cl.
*B32B 3/02* (2006.01)

(52) U.S. Cl. ............... 428/64.1; 428/64.4; 428/64.8; 430/270.14

(58) Field of Classification Search ............. 428/64.1, 428/64.4, 64.8; 430/270.14, 270.16
See application file for complete search history.

(56) References Cited

U.S. PATENT DOCUMENTS

| 2,485,197 | A | 10/1949 | Grossmann et al. |
| 2,848,462 | A | 8/1958 | Gutzwiller et al. |

(Continued)

FOREIGN PATENT DOCUMENTS

| AU | 199657908 B2 | 12/1996 |
| DE | 222205 | 3/1999 |

(Continued)

OTHER PUBLICATIONS

International Search Report, International Application No.: PCT/US02/05050, International Filing Date: Feb. 6, 2002, Date of Mailing: Sep. 6, 2002, 8 pgs.

(Continued)

*Primary Examiner*—Elizabeth Mulvaney

(57) ABSTRACT

In one embodiment, a limited play optical storage medium for data comprises: a reflective layer, a control portion comprising an optically transparent polymeric resin and a light absorbing material, wherein the control portion has a light transmission of greater than or equal to about 70% at 650 nm, a curing index of greater than or equal to about 0.1 and a filtration index of greater than or equal to about 2.5, and wherein the light absorbing material has a minimum extinction coefficient (measured in $CH_2Cl_2$ solution) at 600 nm of greater than or equal to 1,500 $mol^{-1} \cdot cm^{-1} \cdot L$, a maximum extinction coefficient (measured in $CH_2Cl_2$ solution) at 650 nm of less than about 1,000 $mol^{-1} \cdot cm^{-1} \cdot L$, a ratio of extinction coefficient at 650 nm to 600 nm less than about 0.1, and a reactive layer disposed between the reflective layer and the control portion, wherein the reactive layer is designed to limit the time during which data on the medium (disposed on a side of the reactive layer opposite the control portion), can be accessed after exposure to oxygen.

46 Claims, 4 Drawing Sheets

U.S. PATENT DOCUMENTS

| | | | |
|---|---|---|---|
| 3,312,655 A | 4/1967 | Dien | |
| 3,507,606 A | 4/1970 | Hildreth et al. | 8/39 |
| 3,635,895 A | 1/1972 | Kramer | 260/47 XA |
| 3,646,071 A | 2/1972 | Frey et al. | 260/371 |
| 3,697,395 A | 10/1972 | Kehr et al. | 204/159.14 |
| 3,697,402 A | 10/1972 | Kehr et al. | 204/159.14 |
| 3,768,976 A | 10/1973 | Hu et al. | 23/254 R |
| 3,853,807 A | 12/1974 | Hunter | |
| 3,875,191 A | 4/1975 | Toth | |
| 3,880,869 A | 4/1975 | Scheuermann et al. | 260/296 P |
| 3,923,454 A | 12/1975 | Genta | 8/39 |
| 3,933,668 A | 1/1976 | Thlem et al. | |
| 3,945,979 A | 3/1976 | Kobayashi et al. | |
| 3,960,751 A | 6/1976 | Moriyama et al. | |
| 3,979,459 A | 9/1976 | Rose | 260/591 |
| 4,001,184 A | 1/1977 | Scott | 260/47 XA |
| 4,128,396 A | 12/1978 | Wick et al. | 8/39 C |
| 4,179,548 A | 12/1979 | Schroeter et al. | 525/329 |
| 4,217,438 A | 8/1980 | Brunelle et al. | 528/202 |
| 4,220,707 A | 9/1980 | Ohmura et al. | 430/325 |
| 4,332,880 A | 6/1982 | Izu et al. | 430/272 |
| 4,404,257 A | 9/1983 | Olson | 428/412 |
| 4,457,855 A | 7/1984 | Sudbury et al. | |
| 4,491,508 A | 1/1985 | Olson et al. | 204/159.13 |
| 4,523,208 A | 6/1985 | Barzynski | 346/214 |
| 4,571,605 A | 2/1986 | Motosugi et al. | 346/216 |
| 4,655,970 A | 4/1987 | Priester et al. | |
| 4,689,171 A | 8/1987 | Blunck et al. | |
| 4,735,631 A | 4/1988 | Orelup | |
| 4,807,220 A | 2/1989 | Miyai et al. | |
| 4,863,634 A | 9/1989 | Claussen et al. | 252/299.1 |
| 4,891,800 A | 1/1990 | Sugaya | 369/275 |
| 4,983,505 A | 1/1991 | Higuchi et al. | |
| 4,997,903 A | 3/1991 | Okamoto | |
| 4,999,418 A | 3/1991 | Krutak et al. | |
| 5,368,988 A | 11/1994 | Shinkai et al. | 430/270 |
| 5,530,083 A | 6/1996 | Phelps et al. | |
| 5,558,808 A | 9/1996 | Smith et al. | 508/556 |
| 5,583,047 A | 12/1996 | Blinka et al. | 436/5 |
| 5,620,839 A | 4/1997 | Kawamoto et al. | 430/523 |
| 5,747,632 A | 5/1998 | Adachi et al. | 528/196 |
| 5,753,413 A | 5/1998 | Nishida et al. | 430/270.13 |
| 5,815,484 A | 9/1998 | Smith et al. | 369/275.1 |
| 5,820,691 A | 10/1998 | Hartman | |
| 5,882,358 A | 3/1999 | Smith et al. | 8/527 |
| 6,011,772 A | 1/2000 | Rollhaus et al. | 369/286 |
| 6,013,145 A | 1/2000 | Amo et al. | |
| 6,117,284 A | 9/2000 | Mueller | 204/192.27 |
| 6,136,347 A | 10/2000 | Pollinger et al. | 424/495 |
| 6,165,299 A | 12/2000 | Guan et al. | |
| 6,168,844 B1 | 1/2001 | Takagishi et al. | 428/64.1 |
| 6,228,440 B1 | 5/2001 | Dailey et al. | 428/1.1 |
| 6,228,933 B1 | 5/2001 | Hiles | |
| 6,246,656 B1 | 6/2001 | Kawakubo et al. | |
| 6,338,933 B1 | 1/2002 | Lawandy et al. | 430/270.1 |
| 6,434,109 B1 | 8/2002 | Rollhaus et al. | |
| 6,475,588 B1 | 11/2002 | Schottland et al. | 428/64.1 |
| 6,475,589 B1 | 11/2002 | Pai-Paranjape et al. | 428/64.1 |
| 6,531,262 B1 | 3/2003 | Lawandy et al. | |
| 6,589,626 B1 | 7/2003 | Selinfreund et al. | |
| 6,590,856 B1 | 7/2003 | Tsukagoshi et al. | |
| 6,733,950 B1 | 5/2004 | Breitung et al. | |
| 6,756,103 B1 | 6/2004 | Thompson et al. | |
| 6,866,909 B1 | 3/2005 | Wisnudel et al. | |
| 2003/0002431 A1 | 1/2003 | Breitung et al. | 369/288 |
| 2003/0198892 A1 | 10/2003 | Ezbiansky et al. | 430/270.14 |
| 2003/0205323 A1 | 11/2003 | Exbiansky et al. | 156/310 |

FOREIGN PATENT DOCUMENTS

| | | |
|---|---|---|
| EP | 0274092 B1 | 7/1988 |
| EP | 0 455 585 A1 | 11/1991 |
| EP | 0 658 804 A2 | 6/1995 |
| EP | 0 658 804 A3 | 6/1995 |
| EP | 0 737 965 | 10/1996 |
| EP | 0 831 473 A | 3/1998 |
| GB | 958924 | 5/1964 |
| GB | 1061948 | 3/1967 |
| GB | 985970 | 3/1985 |
| JP | 55030605 | 3/1980 |
| JP | 57150152 | 9/1982 |
| JP | 57212634 | 12/1982 |
| JP | 58224448 | 12/1983 |
| JP | SHO 60-213938 | 4/1984 |
| JP | 59124891 | 7/1984 |
| JP | 59151346 | 8/1984 |
| JP | 60093983 | 5/1985 |
| JP | 60127542 | 7/1985 |
| JP | 60256944 | 12/1985 |
| JP | 61063489 | 4/1986 |
| JP | 61260435 | 11/1986 |
| JP | 63218398 | 9/1988 |
| JP | 02018728 | 1/1990 |
| JP | 02037539 | 2/1990 |
| JP | 04238086 | 8/1992 |
| JP | 05273691 | 10/1993 |
| JP | 5273691 | 10/1993 |
| JP | 2000195100 | 7/2000 |
| JP | 2001093190 | 4/2001 |
| JP | 60261046 | 12/2005 |
| PL | 170632 B1 | 7/1994 |
| WO | WO 96/39693 A1 | 12/1996 |
| WO | WO 96/39693 | 12/1996 |
| WO | WO 96/40850 | 12/1996 |
| WO | WO 98/11539 | 3/1998 |
| WO | WO 98/31011 | 7/1998 |
| WO | WO 98/41979 A | 9/1998 |
| WO | WO 01/29828 | 4/2001 |
| WO | WO 02/29801 A | 4/2002 |
| WO | WO 02/49010 A2 | 6/2002 |
| WO | WO 02/099470 | 12/2002 |

OTHER PUBLICATIONS

Japanese Abstract, Patent No.: JP60093983, May 25, 1985, 5 pgs.

Japanese Abstract, Patent No.: JP55030605, Mar. 4, 1980, 4 pgs.

Japanese Abstract, Patent No.: 06–060422, Mar. 4, 1994, 7 pgs.

FlexPlay Coating Recipe, Aprills, Inc. and FlexPlay Technologies, Inc., Richard Minns, Mar. 29, 2000, 3 pgs.

wysiwyg://119/http://www.matweb . . . cMaterialPrint.asp?bassnum=C, MatWeb.com, The Online Materials Database Overview—Polycarbonate, Optical Grade, 3 pgs.

ECMA, Standardizing Information and Communication Systems, Standard ECMA—267, 3rd Edition—Apr. 2001, 95 pgs.

Japanese Abstract, Patent No.: JP5273691, Oct. 22, 1993, 5 pgs.

U.S. Appl. No. 10/384,986, filed Mar. 10, 2003, Olson et al.

U.S. Appl. No. 10/391,401, filed Mar. 18, 2003, Olson et al.

P. Seserko, et al. "Transparent Barrier Coatings by Electron Beam Evaporation–An Update". 41st Annual Technical Conference Proceedings. Soc. of Vacuum Coaters, Albuquerque, NM, USA (1998) ISSN 0737–5921. pp. 424–428.

Encyclopedia of Polymer Science and Technology, vol. 1, Interscience Publishers, John Wiley & Sons, Inc., 1964, pp. 246, et seq.

U.S. Appl. No. 10/619,643, filed Jul. 15, 2003; Colored Polymeric Resin Composition, Article Made Therefrom, and Method for Making the Same; 44 pages (GP1–0126).

Arient, J. and Slavik, V., Collect. Czech Commun., 34, Feb. 13, 1969, 3582, "Anthraquinone Dyes– Cyclisation of 1–Phenylaminoanthraquinone Derivative in Aluminumchloride Melt." (translation).

Lord, W. Marin and Arnold T. Peters, School of Colour Chemistry, The University, Brandford BD7 1DP, "New Intermediates and Dyestuff for Synthetic Fibers, Part VI. 1–Aryl–aminoanthrquinoes>" J. Chemical Society, Perkin Tran. 1 (1973), 20, 2305–8.

Chemical Abstracts, vol. 126, No. 20, May 19, 1997, Columbus, Ohio., Abstract No. 263931, Walczak, Antoni et al., "Preparation of 4–phenylbenzophenone", 1 page.

John McMurray; Organic Chemistry Second Edition; p. 751 and pp. 530–533; 1984.

U.S. Appl. No. 2002/0102499 A1, filed Aug. 1, 2002, Krieg–Kowald.

U.S. Appl. No. 2003/0207206 A1, filed Nov. 6, 2003, Olson et al.

U.S. Appl. No. 2004/0014859 A1, filed Jan. 22, 2004, Ezbiansky et al.

U.S. Appl. No. 2004/0022986 A1, filed Feb. 5, 2004, Van de Grampel et al.

U.S. Appl. No. 2004/0043254 A1, filed Jan. 4, 2004, Wisnudel et al.

U.S. Appl. No. 2004/0152014 A1, filed Aug. 5, 2004, Breitung et al.

U.S. Appl. No. 2004/0025988 A1, filed Feb. 3, 2005, Wisnudel et al.

U.S. Appl. No. 2005/0051053 A1, filed Mar. 10, 2005, Wisnudel et al.

JP 2001093190 A; Publication Date: Apr. 6, 2001 (translation of abstract only).

JP 200195100 A; Publication Date: Jul. 14, 2000 (translation of abstract only).

JP 57150152 A; Publication Date: Sep. 16, 1982 (translation of abstract only).

JP 59151346; Publication Date: Aug. 29, 1984 (translation of abstract only).

JP 05273691; Publication Date: Oct. 22, 1993, (translation of abstract only).

JP 04238086 A; Publication Date: Aug. 26, 1992 (translation of abstract only).

JP 02018728 A; Publication Date: Jan. 23, 1990 (translation of abstract only).

JP 61260435 A; Publication Date: Nov. 18, 1986 (translation of abstract only).

JP 02037539; Publication Date: Feb. 7, 1990 (translation of abstract only).

JP 59124891 A; Publication Date: Jul. 1, 1984 (translation of abstract only).

JP 58224448 A: Publication Date: Dec. 26, 1983 (translation of abstract only).

JP 57212634; Publication Date: Dec. 27, 1982 (translation of abstract only).

JP 63218398 A; Publication Date: Sep. 12, 1988 (translation of abstract only).

JP 61063489 A; Publication Date: Apr. 1, 1986 (translation of abstract only.

JP 60127542 A; Publication Date: Jul. 8, 1985 (translation of abstract only).

JP 60256944 A; Publication Date: Dec. 18, 1985 (translation of abstract only).

JP 60261046 A; Publication Date: Dec. 24, 1985 (translation of abstract only).

International Search Report; International Application No. PCT/US2004/022482; Date of Mailing Dec. 14, 2004.

Sax, J.E., et al "Permeabilities of Radiation Cured Materials", International Journal of Radiation Applications Instrumentation, Part C, Radiation Physics and Chemistry, vol. 31, Issues 4–6, 1988k, pp. 887–896.

Larson, E.G., et al. "Properties of Radiation Cured Coatings", International Journal of Radiation Applications Instrumentation, Part C, Radiation Physics and Chemistry, vol. 30, Issue 1, 1987, pp. 11–15.

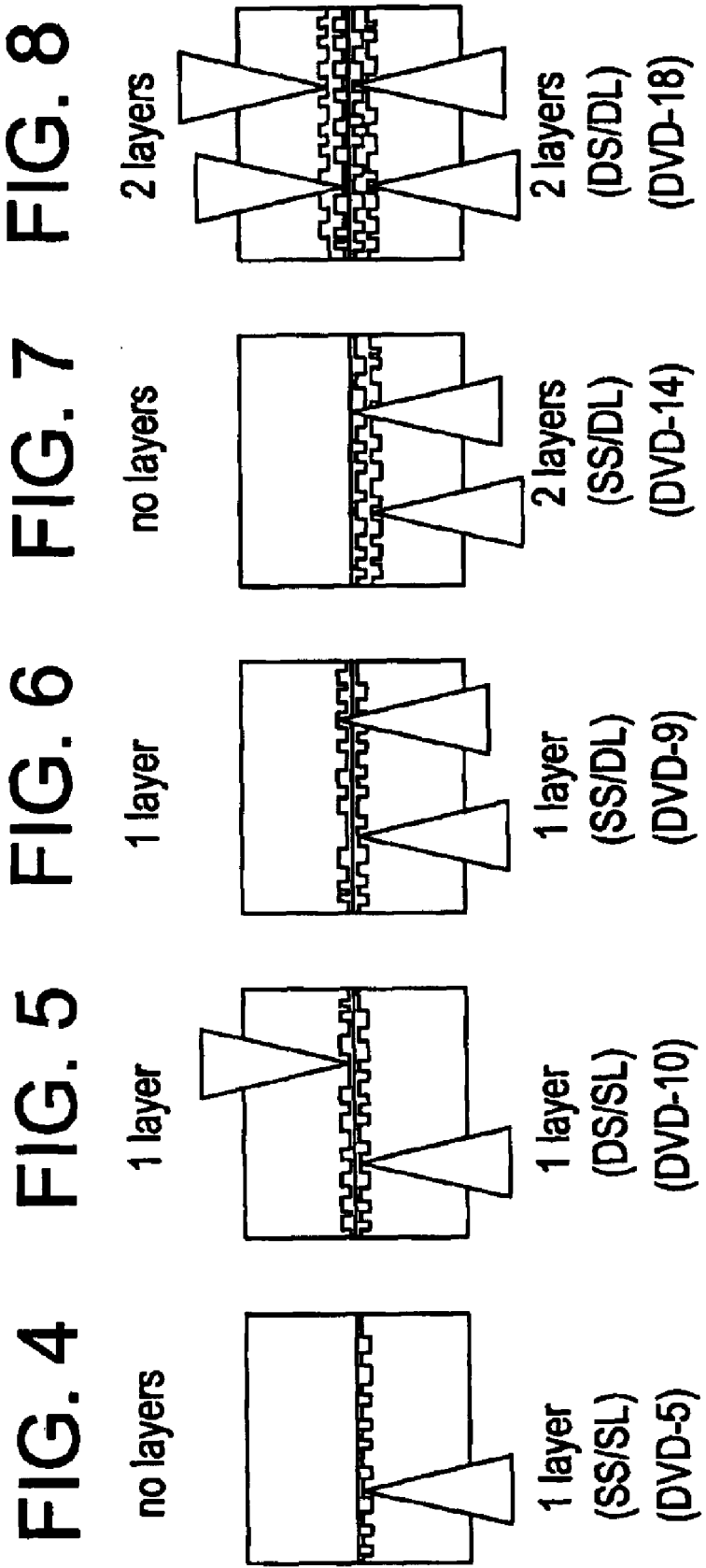

LIMITED PLAY OPTICAL STORAGE MEDIUM, METHOD FOR MAKING THE SAME

BACKGROUND

Optical data storage media are often utilized to store data such as music, computer programs, movies, audio books, and the like. While it is generally desirable for data storage media to have long service lifetimes, it is sometimes desirable, in certain applications, to limit the life of the storage media. For example, sample computer programs are often provided to potential customers in order to entice them to purchase the software. These programs are intended to be used only for a limited period of time in order to protect the intellectual property rights of the owner(s). In addition, music and movies are currently rented to customers for a limited time period after which they need to be returned. There is also a desire on the part of movie studios as well as the music industry to minimize the piracy of movies and music respectively. In each of the aforementioned applications, it would be desirable to minimize the time-period for which the data storage media can be actively utilized, following which the media becomes unusable.

In order for the limited play media to be a viable product, it must have sufficient quality when it is first used. The quality should then degrade to unusable in a predetermined period of time. Finally, once unusable, the limited play functionality should not be reversible. If the method for providing limited play to data storage media can be easily defeated by a customer or a cottage industry, the data storage media would no longer be "limited-play". In the case of a coating or material rendering an optical disk unplayable, for example, facile removal or modification of that coating and/or material could provide a disk with unlimited play-ability. Therefore the attainment of limited play features in optical data storage media without being easily defeatable is a feature that is widely sought after.

SUMMARY

Disclosed herein are embodiments of limited play optical storage medium, methods of making the same, and methods of limiting play in a data storage media. In one embodiment, a limited play optical storage medium for data comprises: a reflective layer, a control portion comprising an optically transparent polymeric resin and a light absorbing material, wherein the control portion has a light transmission of greater than or equal to about 70% at 650 nm, a curing index of greater than or equal to about 0.1 and a filtration index of greater than or equal to about 2.5, and wherein the light absorbing material has a minimum extinction coefficient (measured in $CH_2Cl_2$ solution) at 600 nm of greater than or equal to 1,500 $mol^{-1} \cdot cm^{-1} \cdot L$, a maximum extinction coefficient (measured in $CH_2Cl_2$ solution) at 650 nm of less than about 1,000 $mol^{-1} \cdot cm^{-1} \cdot L$, a ratio of extinction coefficient at 650 nm to 600 nm less than about 0.1, and a reactive layer disposed between the reflective layer and the control portion, wherein the reactive layer is designed to limit the time during which data on the medium (disposed on a side of the reactive layer opposite the control portion), can be accessed after exposure to oxygen.

In one embodiment, the method for manufacturing a limited play optical storage medium comprises: combining a polymeric resin and a light absorbing material to form a control composition, forming the control composition into a control portion having a light transmission of greater than or equal to about 70% at 650 nm, a curing index of greater than or equal to about 0.5 and a filtration index of greater than or equal to about 2.5, and wherein the light absorbing material has a minimum extinction coefficient (measured in $CH_2Cl_2$ solution) at 600 nm of greater than or equal to about 1,500 $mol^{-1} \cdot cm^{-1} \cdot L$, a maximum extinction coefficient (measured in $CH_2Cl_2$ solution) at 650 nm of less than about 1,000 $mol^{-1} \cdot cm^{-1} \cdot L$, a ratio of extinction coefficient at 650 nm to 600 nm less than about 0.1, and disposing a reflective layer and a reactive layer on a side of the control portion wherein the reactive layer is disposed between the control portion and the reflective layer, and wherein the reactive layer is designed to limit the time during which data on the medium (disposed on a side of the reactive layer opposite the control portion) can be accessed after exposure to oxygen.

The above described and other features are exemplified by the following figures and the detailed description.

BRIEF DESCRIPTION OF THE DRAWINGS

Referring now to the figures, which are exemplary, not limiting:

FIG. 4 is a schematic of a DVD construction having a single reflective data layer and a single read side (DVD-5 configuration);

FIG. 5 is a schematic of a DVD construction having two reflective data layers, both disposed on opposite sides of the center of the substrate, and each readable from different sides of the substrate (DVD-10 configuration);

FIG. 6 is a schematic of a DVD construction having two reflective data layers, both disposed on opposite sides of the bonding layer, and both readable from the same side of the substrate (standard DVD-9 configuration);

FIG. 7 is a schematic of a DVD construction having two reflective data layers, both disposed on the same side of the bonding layer, and both readable from the same side of the substrate ("Special" DVD-9 and DVD-14 configurations); and FIG. 8 is a schematic of a DVD construction having four reflective data layers, two disposed on each side of the (bonding layer), and two readable from each side of the substrate.

DETAILED DESCRIPTION

Figure 1:
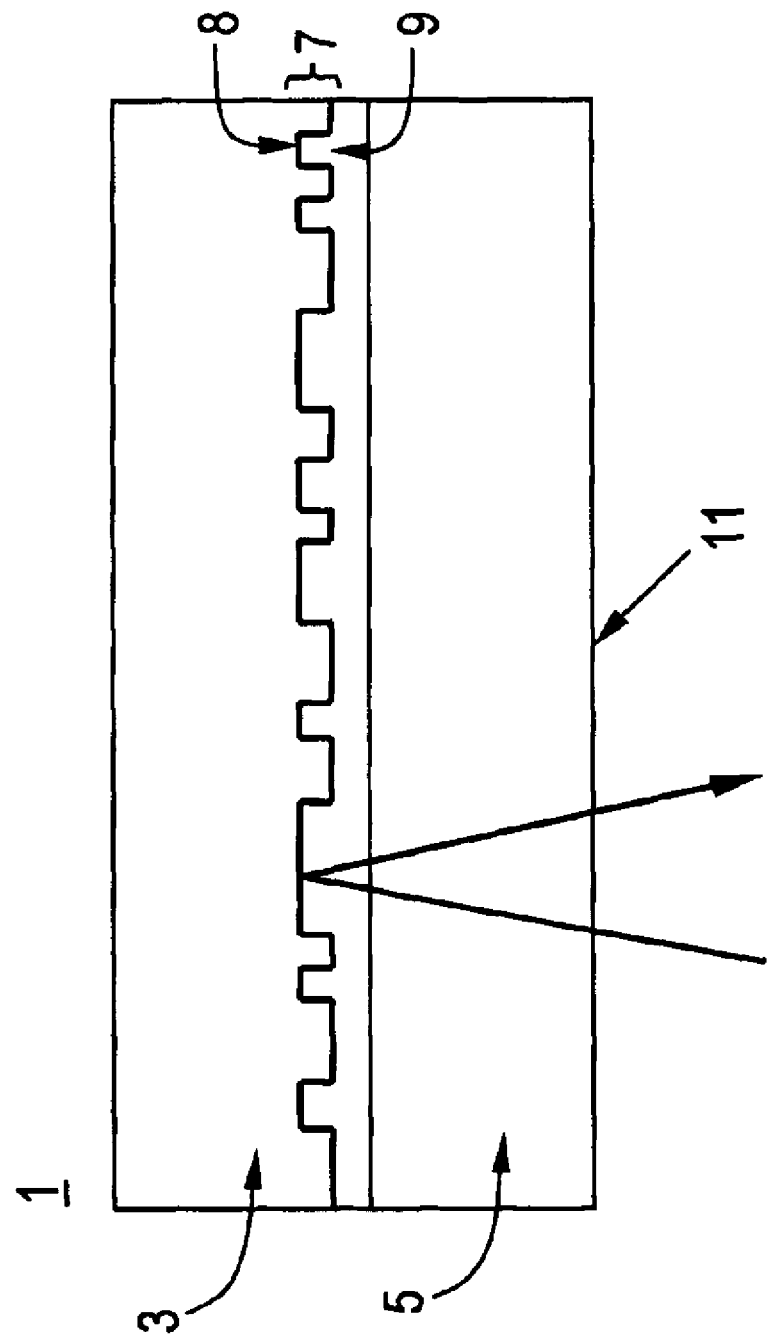
FIG. 1 represents one possible configuration of a limited play data storage media.
Figure 2:
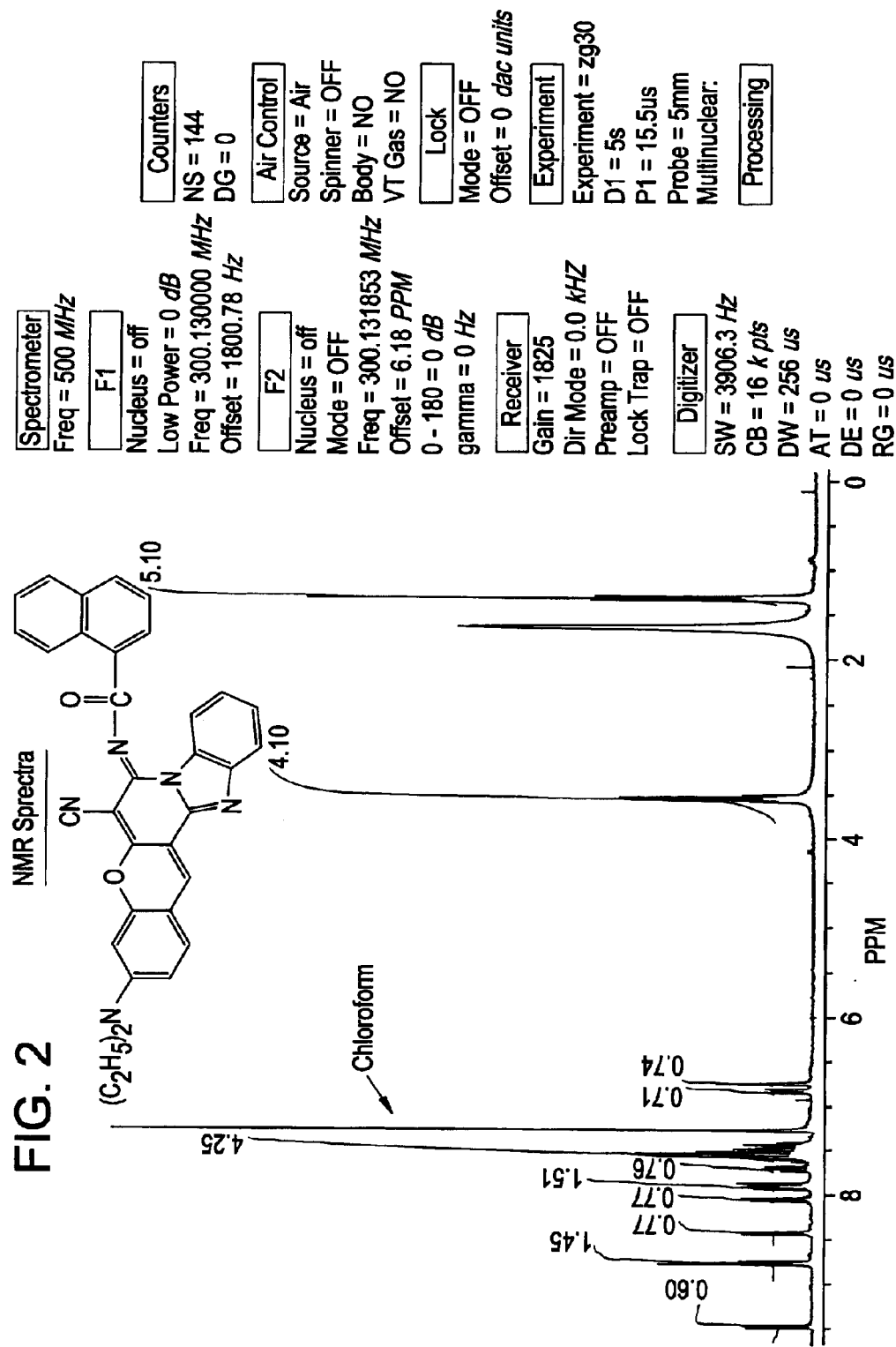
FIG. 2 is a graphical representation of the NMR spectrum of benzopyran red.
Figure 3:
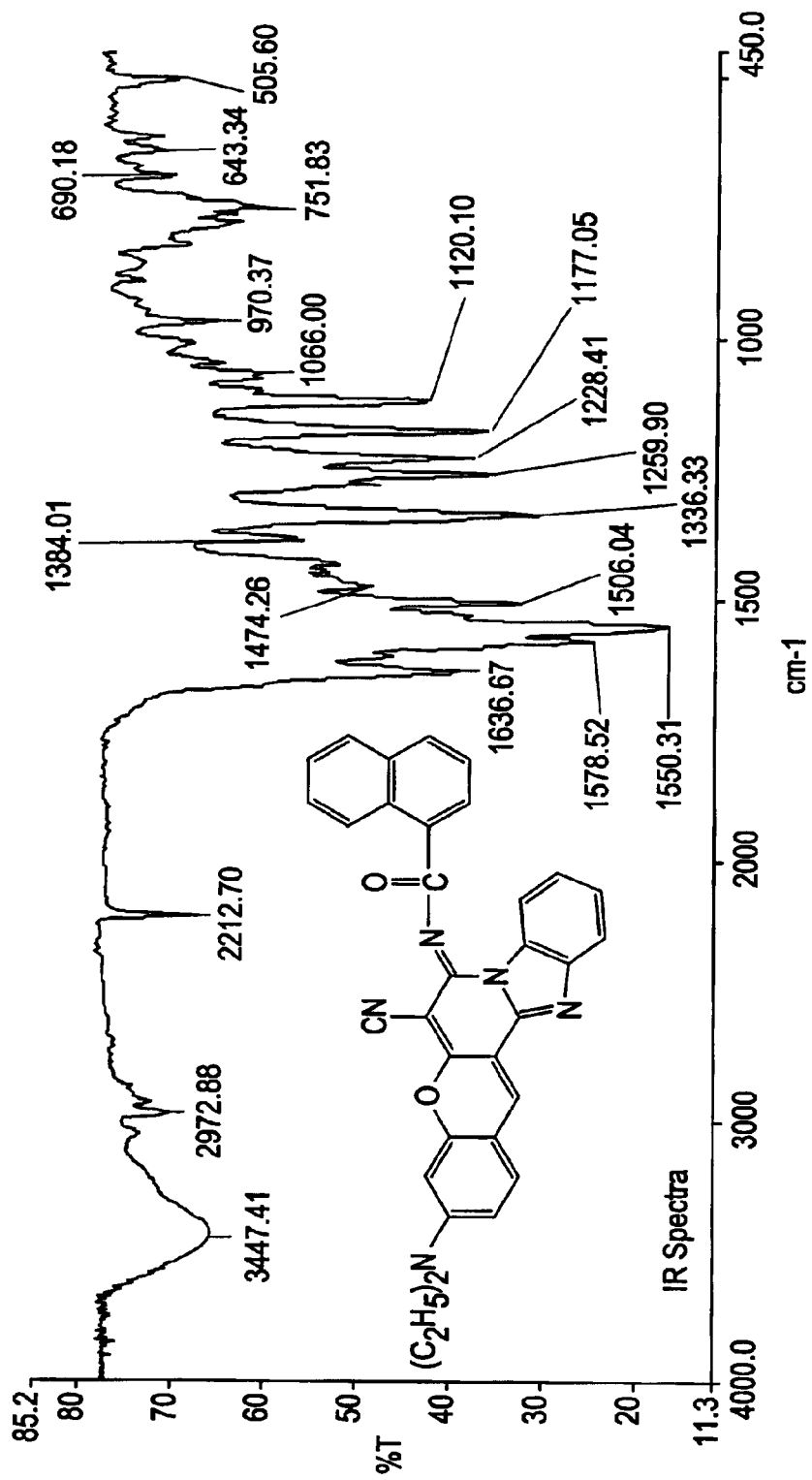
FIG. 3 is a graphical representation of the infra-red spectrum of benzopyran red.

One type of limited play media uses a reactive dye. For example, the reactive dye layer can be a dye that changes its optical properties at desired laser wavelengths when exposed to oxygen; i.e., upon oxidation, the reactive dye layer will create an absorption at the laser wavelength that will be sufficient to prevent readback from a media player. Possible dyes include those of the azine family (including thiazines, oxazines, and the like) optionally comprising various substituents that may be fused rings. For example, the reactive dye can be derived from leuco methylene blue, which gradually oxidizes upon exposure to oxygen and becomes light absorbing at a readback laser wavelength of about 650 nanometers (nm). When a certain level of light absorption at the readback laser wavelength of 650 nanometers is exceeded, the data storage media becomes unreadable. Unfortunately, the oxidized methylene blue layer has a limited stability when exposed to light (e.g., sunlight, ultraviolet lamp, and the like) and begins to degrade, thus reducing the light absorption at the wavelength of 650 nanometers. As the absorption at 650 nanometers is steadily reduced, the storage media becomes readable again. Thus, if the optical data storage media is exposed to light for an extended period of time, it potentially becomes defeatable.

Disclosed herein is a limited play optical data storage media. The media may comprise a substrate, a reactive layer, a reflective layer (optionally comprising data) and a protective layer or subsequent substrate. Essentially, the reactive layer is disposed between the reflective layer and a read thru surface of the media (i.e., the surface from which the media is read). The protective layer and/or subsequent substrate (hereinafter the "control portion") are disposed on a side of the reactive layer opposite the reflective layer (i.e., the control portion is disposed between the light source and the reactive layer, and the reactive layer is disposed between the light source and the reflective layer). Optionally, a data can be disposed on a side of the reactive layer opposite the control portion.

It is understood that there are various types of media, for example, various types of digital video recordings (DVD's), some of which are illustrated in FIGS. 4–8. In the case of a single layer read from a readout surface (e.g. DVD 5, DVD 10), a stamped surface is covered with a thin reflective data layer by a sputtering or other deposition process. (See FIGS. 4 and 5) For two data layer DVDs that are read from the same readout surface 7 (e.g., DVD 9, DVD 14, DVD 18), the laser must be able to reflect from the first layer when reading it, but also focus (or transmit) through the first layer when reading the second layer. (See FIGS. 6, 7, and 8; DVD 9, DVD 14, DVD 18, respectively) Therefore, the first layer is "semi-transparent" (i.e., semi-reflective), while the second layer is "fully-reflective".

Depending on the metallization thickness on the "fully reflective" layer, some light may be transmitted through the layer, especially at wavelengths below 450 nm. When the maximum light transmitted through the substrate from the opposite side of the read surface is greater than or equal to about 5% at any wavelength in the about 300 to about 800 nm range, it is preferred to have a control portion on both sides of the reactive layer to ensure adequate defeatability protection. It is more preferred to have a control portion on both sides when transmission is greater than or equal to about 3%, and even more preferred when transmission is greater than or equal to about 1%.

The control portion comprises a light absorbing material capable of preventing the defeatability of the limited play functionality by light exposure at wavelengths of about 450 nm to about 600 nanometers (nm). Preferably, the control portion is capable of preventing the defeatability of the limited play functionality by light exposure at wavelengths of about 450 nm to about 650 nm. As a result of its light transmission characteristics, in one embodiment, this control portion typically has a red, magenta or violet color. Note however that the control portion could also have other dark colors such as black if a light absorbing material covering visible wavelengths above 650 nm is added. The desired light absorbing capability preference is a balance between sufficient light absorbing capability at a wavelength capable of defeating the limited play functionality and allowing proper photocuring of the storage media during production. In other words, the light absorbing material is capable of absorbing light capable of degrading the functionality of the reactive layer, while allowing the transmission of energy (e.g., light) employed to read the media. Preferably, an absorbance ratio of 650 nm to 600 nm, as it relates to disk playability, is less than or equal to about 0.1, with an absorbance ratio of less than or equal to about 0.05 preferred, and an absorbance ratio of less than or equal to about 0.02 more preferred.

For example, the control portion of the media (when in the form of a 0.60 millimeter (mm) thick substrate) is capable of permitting light transmissivity in the read wavelengths (e.g., transmission of greater than or equal to about 70% of the light at a wavelength of about 650 nanometers (nm)), while having a light transmissivity of less than or equal to about 30% at wavelengths of about 500 to about 600 nm. Preferably, the control portion, when in the form of a 0.60 millimeter (mm) thick substrate, has a light transmissivity at a wavelength of about 600 nm of less than or equal to about 30%, with a light transmissivity of less than or equal to about 5%, more preferably less than or equal to about 3%, and even more preferably less than or equal to about 1%, at a wavelength of about 550 nm preferred. Also, the control portion should be stable at all processing and use temperatures.

The preferred control portion properties can further be described in relation to a curing index, and a filtration index. The curing index was calculated according to the following Equation 1:

$$\text{Curing Index} = \frac{\sum_{\lambda=330}^{\lambda=450} \% \, T_{color}(\lambda) \times \text{Lamp Energy}(\lambda)}{\sum_{\lambda=330}^{\lambda=450} \% \, T_{clear}(\lambda) \times \text{Lamp Energy}(\lambda)} \times 100 \quad (1)$$

where:

% $T_{color}$ ($\lambda$) represents the light transmission at each wavelength $\lambda$ (nm) of the disk substrate including the control portion with the light absorbing material.

% $T_{clear}$ ($\lambda$) represents the light transmission at each wavelength $\lambda$ (nm) of a reference disk substrate where there is no light absorbing material (e.g. clear polycarbonate substrate)

$\lambda$ represents the wavelength (nm)

Lamp Energy ($\lambda$) represents the efficient lamp energy at each wavelength calculated as explained in Example 10

A curing index of greater than or equal to about 0.1 can be employed, with greater than or equal to about 0.5 preferred, greater than or equal to about 5 more preferred, greater than or equal to about 10 even more preferred, and greater than or equal to about 20 especially preferred.

The photobleach protection efficiency of the control portion can be expressed by the photobleach filtration index, which is calculated as set forth in Equation (2):

$$\text{Filtration Index} = \frac{\sum_{\lambda=400}^{\lambda=650} \% \, T_{clear}(\lambda)}{\sum_{\lambda=400}^{\lambda=650} \% \, T_{color}(\lambda)} \quad (2)$$

where:

% $T_{color}$ ($\lambda$) represents the light transmission at each wavelength $\lambda$ (nm) of the disk substrate including the control portion with the light absorbing material.

% $T_{clear}$ (λ) represents the light transmission at each wavelength λ (nm) of a reference disk substrate where there is no light absorbing material (e.g. clear polycarbonate substrate)

represents the wavelength (nm)

The filtration index, for example, describes the filtration power of the resin formulation and is the sum of all the transmitted light (taken every nm from 400 nm to 650 nm) through a colorless reference substrate divided by the sum of the transmitted light (taken every nm from 400 nm to 650 nm) through the colored substrate (i.e., through the control portion substrate alone (e.g., half disk containing the light absorbing material) in its initial condition. A filtration index of greater than or equal to about 2.5 is desired, with greater than or equal to about 4.0 preferred, greater than or equal to about 5.0 more preferred, greater than or equal to about 6.0 even more preferred, and greater than or equal to about 7.0 especially preferred.

An additional preferred feature of the control portion is an absorbance ("Abs") ratio capable of inhibiting photo bleaching (i.e., light degradation of the limited play functionality). The absorbance ratio is the ratio of absorbance (or optical density) of the control portion measured in transmission mode at 2 key wavelengths: control wavelength for photobleaching (numerator) and curing wavelength (denominator); e.g., Abs@600 nm/Abs@365 nm or Abs@600 nm/Abs@400 nm. To attain the desired protection of the reactive layer, at least one of the light absorbing materials used to form the control portion preferably has an absorbance ratio of greater than or equal to about 3, wherein the absorbance ratio is at a wavelength of light of 600 nm (i.e., the control wavelength for photobleaching) versus a wavelength of light of 365 nm or 400 nm (depending on the curing system used). Typically, such ratios are measured in a dichloromethane solution ($CH_2Cl_2$) but determination in plastic is also possible. It is noted that the control wavelength of 600 nm was selected based on the fact that, in the particular embodiment described above in relation to data storage media (e.g., optical disks, particularly DVDs) the transmission of the control portion is preferably maximized at 650 nm while the lowest transmission is preferably achieved below 650 nm. As sharp spectral transitions are quite unusual at wavelengths around 650 nm, it appeared that 600 nm was a useful wavelength to define the spectral characteristics of control portion (e.g., the red, magenta and/or violet) in terms of ability to protect against defeatability caused by photobleaching of the reactive layer.

For a storage media that will be read at a wavelength of about 650 nm, it is desirable for the control portion, and preferably for the light absorbing material, to have an absorbance ratio of 600 nm to 365 nm (or 600 nm to 400 nm) of greater than or equal to about 2, preferably greater than or equal to about 3, more preferably greater than or equal to about 5, even more preferably greater than or equal to about 10, and yet even more preferably greater than or equal to about 20. It is also desirable for the light absorbing material to have an absorbance ratio of 650 nm to 600 nm of less than or equal to about 0.15, preferably less than or equal to about 0.10, more preferably less than or equal to about 0.075, and even more preferably less than or equal to about 0.05. Unless set forth otherwise, all absorbance ratios are measured using a double beam spectrophotometer at a dye concentration yielding a maximum absorption between 0.8 and 1.2 units for a 1 centimeter (cm) path length.

It is further preferred that the light absorbing material provide additional limited play functionality to the media, i.e., the transmissivity at the desired wavelength (e.g., the read wavelength) of the light absorbing material decreases over time. For example, 1,8-bis(cyclohexylamino) anthraquinone exhibits a lower percent transmissivity at 650 nm after exposure to sunlight. Such light absorbing material (and other light absorbing materials with similar properties) are "active" materials that not only provide photobleaching protection but also intrinsic defeatability protection as they actively contribute to rendering the media less readable.

Referring to FIG. 1, in one possible configuration of an optical data storage media, a digital versatile disk (e.g., DVD-5) 1 comprises two bonded plastic substrates (or resin layers) 3,5, each typically having a thickness of about 0.30 mm to about 1.0 mm. Within this range, a thickness of less than or equal to about 0.7 mm is generally preferred. A thickness of greater than or equal to about 0.4 mm is also preferred. The first substrate comprises a reflective layer 8 generally disposed on a side of a data layer 7 (e.g., the reflective layer having the pits and grooves); and a reactive layer 9, which generally enables the limited play features of the disk and may also serve to bond the two substrates, if desired. The reactive layer 9 is generally disposed between the two substrates 3,5, or between a substrate 3 and a coating (not shown). The reactive layer 9 is disposed on the read thru surface of the substrate 5 (also known as the read side substrate), opposite the substrate surface 11 through which the laser traverses as it reads data from the media 1.

Polymeric resins that may be used to form the substrate may be amorphous, crystalline, and semi-crystalline thermoplastic materials such as, but not limited to polyvinyl chloride, polyolefins (including, but not limited to, linear and cyclic polyolefins and including polyethylene, chlorinated polyethylene, polypropylene, and the like), polyesters (including, but not limited to, polyethylene terephthalate, polybutylene terephthalate, polycyclohexylmethylene terephthalate, and the like), polyamides, polysulfones (including, but not limited to, hydrogenated polysulfones, and the like), polyimides, polyether imides, polyether sulfones, polyphenylene sulfides, polyether ketones, polyether ether ketones, ABS resins, polystyrenes (including, but not limited to, hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including, but not limited to, polymethylmethacrylate, methyl methacrylate-polyimide copolymers, and the like), polyacrylonitrile, polyacetals, polycarbonates, polyphenylene ethers (including, but not limited to, those derived from 2,6-dimethylphenol and copolymers with 2,3,6-trimethylphenol, and the like), ethylene-vinyl acetate copolymers, polyvinyl acetate, liquid crystal polymers, ethylene-tetrafluoroethylene copolymers, aromatic polyesters, polyvinyl fluoride, polyvinylidene fluoride, polyvinylidene chloride, polytetrafluoroethylenes, or the like, or combinations comprising at least one of the foregoing polymeric resins.

A substrate located on the read side should allow laser transmission without creating interferences (e.g., light scattering, significant light absorption or the like). Consequently, the substrate that must be read thru by the laser is generally amorphous and optically transparent. In a single sided DVD format such as DVD-5 or DVD-9, the opposite substrate to the read side may be opaque. In such case, the non-read side can be amorphous, crystalline or semi-crystalline and without regard to optical transparency at the laser wavelength.

A preferred polymeric resin that may be utilized in the substrate is a polycarbonate. As used herein, the terms "polycarbonate", "polycarbonate composition", and "composition comprising aromatic carbonate chain units" includes compositions having structural units of the Formula (I):

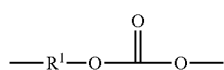
(I)

in which greater than or equal to about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the Formula (II):

$$-A^1-Y^1-A^2-$$ (II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative, examples of radicals of this type are —O—, —S—, —S(O)—, —S(O$_2$)—, —C(O)—, methylene, cyclohexylmethylene, 2-[2,2,1]-bicycloheptylidene, ethylidene, isopropylidene, neopentylidene, cyclohexylidene, cyclopentadecylidene, cyclododecylidene, adamantylidene, and the like. In another embodiment, zero atoms separate $A^1$ from $A^2$, with an illustrative example being bisphenol (OH-benzene-benzene-OH). The bridging radical $Y^1$ can be a hydrocarbon group or a saturated hydrocarbon group such as methylene, cyclohexylidene or isopropylidene.

Polycarbonates may be produced by the interfacial reaction of the carbonate precursor with dihydroxy compounds. Typically, an aqueous base such as (e.g., sodium hydroxide, potassium hydroxide, calcium hydroxide, and the like,) is mixed with an organic, water immiscible solvent such as benzene, toluene, carbon disulfide, or dichloromethane, which contains the dihydroxy compound. A phase transfer agent is generally used to facilitate the reaction. Molecular weight regulators may be added either singly or in admixture to the reactant mixture. Branching agents, described forthwith may also be added singly or in admixture.

Polycarbonates can be produced by the interfacial reaction of dihydroxy compounds in which only one atom separates $A^1$ and $A^2$. As used herein, the term "dihydroxy compound" includes, for example, bisphenol compounds having general Formula (III) as follows:

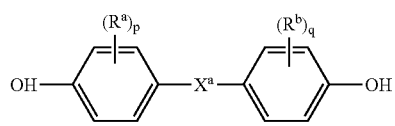
(III)

wherein $R^a$ and $R^b$ each independently represent hydrogen, a halogen atom, or a monovalent hydrocarbon group; p and q are each independently integers from 0 to 4; and $X^a$ represents one of the groups of Formula (IV):

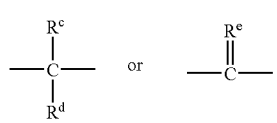
(IV)

wherein $R^c$ and $R^d$ each independently represent a hydrogen atom or a monovalent linear or cyclic hydrocarbon group, and $R^e$ is a divalent hydrocarbon group.

Examples of the types of bisphenol compounds that may be represented by Formula (III) includes the bis(hydroxyaryl)alkane series such as, 1,1-bis(4-hydroxyphenyl)methane, 1,1-bis(4-hydroxyphenyl)ethane, 2,2-bis(4-hydroxyphenyl)propane (or bisphenol-A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, and the like; bis(hydroxyaryl)cycloalkane series such as, 1,1-bis(4-hydroxyphenyl)cyclopentane, 1,1-bis(4-hydroxyphenyl)cyclohexane, and the like; and the like, as well as combinations comprising at least one of the foregoing bisphenol compounds.

Other bisphenol compounds that may be represented by Formula (III) include those where X is —O—, —S—, —SO— or —SO$_2$—. Some examples of such bisphenol compounds are bis(hydroxyaryl)ethers such as 4,4'-dihydroxy diphenylether, 4,4'-dihydroxy-3,3'-dimethylphenyl ether, and the like; bis(hydroxy diaryl) sulfides, such as 4,4'-dihydroxy diphenyl sulfide, 4,4'-dihydroxy-3,3'-dimethyl diphenyl sulfide, and the like; bis(hydroxy diaryl) sulfoxides, such as, 4,4'-dihydroxy diphenyl sulfoxides, 4,4'-dihydroxy-3,3'-dimethyl diphenyl sulfoxides, and the like; bis(hydroxy diaryl)sulfones, such as 4,4'-dihydroxy diphenyl sulfone, 4,4'-dihydroxy-3,3'-dimethyl diphenyl sulfone, and the like; and the like, as well as combinations comprising at least one of the foregoing bisphenol compounds.

Other bisphenol compounds that may be utilized in the polycondensation of polycarbonate are represented by the Formula (V):

(V)

wherein, $R^f$, is a halogen atom of a hydrocarbon group having 1 to 10 carbon atoms or a halogen substituted hydrocarbon group; n is a value from 0 to 4. When n is at least 2, $R^f$ may be the same or different. Examples of bisphenol compounds that may be represented by the Formula (V), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, and the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, and the like; and the like, as well as combinations comprising at least one of the foregoing bisphenol compounds.

Bisphenol compounds such as 2,2,2',2'-tetrahydro-3,3,3',3'-tetramethyl-1,1'-spirobi-[1H-indene]-6,6'-diol represented by the following Formula (VI) may also be used.

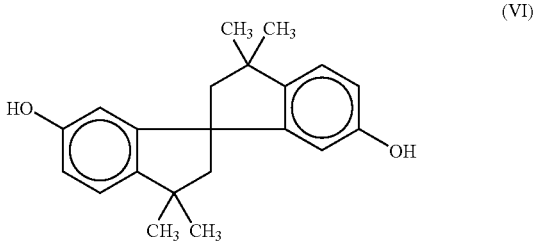

(VI)

The preferred bisphenol compound is bisphenol A.

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, and the like, and the bis-haloformates of glycols such as ethylene glycol and neopentyl glycol; and the diaryl carbonates, such as diphenyl carbonate, di(tolyl) carbonate, and di(naphthyl) carbonate. The preferred carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecanedioic acid.

Siloxane-polycarbonate block copolymers have been recognized for their low temperature ductility and flame retardancy and may also be utilized as the matrix for incorporating the phosphorescent pigments. These block copolymers can be made by introducing phosgene under interfacial reaction conditions into a mixture of a dihydric phenol, such as BPA, and a hydroxyaryl-terminated polydiorganosiloxane. The polymerization of the reactants can be facilitated by use of a tertiary amine catalyst.

Some of the hydroxyaryl-terminated polydiorganosiloxanes that may be used include phenol-siloxanes of the Formula (VII):

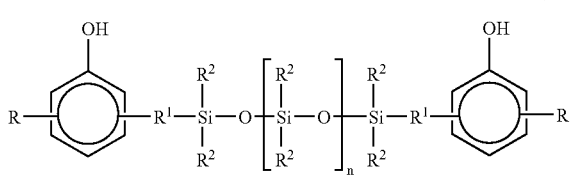

(VII)

where each R may be the same or different and is selected from the group of radicals consisting of hydrogen, halogen, $C_{(1-8)}$ alkoxy, $C_{(1-8)}$ alkyl and $C_{(6-13)}$ aryl, $R^1$ is a $C_{(2-8)}$ divalent aliphatic radical, $R^2$ is selected from the same or different $C_{(1-13)}$ monovalent organic radicals, and n is an integer greater than or equal to 1, preferably greater than or equal to about 10, more preferably greater than or equal to about 25 and most preferably greater than or equal to about 40. It is also preferred to have n be an integer less then or equal to 1000, preferably less than or equal to 100, more preferably less than or equal to about 75 and most preferably less than or equal to about 60. In one embodiment n is less than or equal to 50. Particularly preferred hydroxyaryl-terminated polydiorganosiloxanes are those where $R^2$ is methyl and R is hydrogen or methoxy and located in the ortho position to the phenolic substituent and where $R^1$ is propyl and located ortho or para to the phenolic substituent.

Some of the radicals included within R in the above Formula (VII) are hydrogen, halogen radicals, such as bromo, and chloro; alkyl radicals such as methyl, ethyl, and propyl; alkoxy radicals such as methoxy, ethoxy, and propoxy; aryl radicals such as phenyl, chlorophenyl, and tolyl. Radicals included within $R^1$ are, for example, dimethylene, trimethylene and tetramethylene. Radicals included within $R^2$ are, for example, $C_{(1-13)}$ alkyl radicals, haloalkyl radicals such as trifluoropropyl and cyanoalkyl radicals; aryl radicals such as phenyl, chlorophenyl and tolyl. $R^2$ is preferably methyl, or a mixture of methyl and trifluoropropyl, or a mixture of methyl and phenyl.

The siloxane-polycarbonate block copolymers have a weight-average molecular weight (Mw, measured, for example, by Gel Permeation Chromatography, ultracentrifugation, or light scattering) of greater than or equal to about 10,000, preferably greater than or equal to about 20,000. Also preferred is a weight average molecular weight of less than or equal to about 200,000, preferably less than or equal to about 100,000. It is generally desirable to have the polyorganosiloxane units contribute about 0.5 to about 80 wt % of the total weight of the siloxane-polycarbonate copolymer. The chain length of the siloxane blocks corresponds to about 10 to about 100 chemically bound organosiloxane units. They can be prepared such as described in for example U.S. Pat. No. 5,530,083, incorporated herein by reference in its entirety.

Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents may comprise polyfunctional organic compounds containing at least three functional groups, which may be hydroxyl, carboxyl, carboxylic anhydride, haloformyl, and combinations comprising at least one of the foregoing branching agents. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, and the like, as well as combinations comprising at least one of the foregoing branching agents. The branching agents may be added at a level of about 0.05 to about 2.0 wt %, based upon the total weight of the substrate.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, bis(diphenyl) carbonate, diethyl carbonate, dimethyl carbonate, dibutyl carbonate, dicyclohexyl carbonate, and the like, as well as combinations comprising at least one of the foregoing carbonic acid diesters. The preferred carbonic acid diester is diphenyl carbonate.

Preferably, the weight average molecular weight of the polycarbonate is about 5,000 to about 100,000 atomic mass units (amu). Within this range, it is desirable to have a weight average molecular weight of greater than or equal to about 10,000, preferably greater than or equal to about 15,000 atomic mass units. Also desirable is a molecular weight of less than or equal to about 65,000, and more preferably less than or equal to about 35,000 atomic mass units.

Light absorbing material(s) are incorporated into the substrate (e.g., the read-thru surface) and/or into a coating disposed between the reactive layer and the read-thru surface. Some possible light absorbing materials include but are not limited to anthraquinone derivatives, benzopyran derivatives, or combinations comprising at least one of the foregoing derivatives that comprise the above described transmission and absorption properties. Typical anthraquinone derivatives may be represented by the general Formula (VIII).

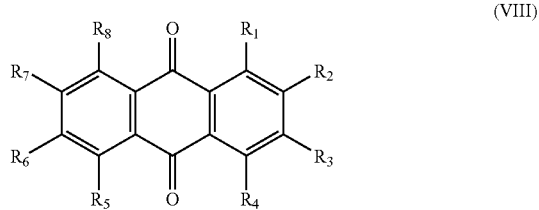

(VIII)

wherein $R_1$, $R_2$, $R_3$, $R_4$, $R_5$, $R_6$, $R_7$ and $R_8$ are the same or different and may be a hydrogen atom, a hydroxyl group, an aliphatic group, an aromatic group, a heterocyclic group, a halogen atom, a cyano group, a nitro group, —$COR_9$, —$SR_{10}$, —$COOR_9$, —$NR_9R_{10}$, —$NR_{10}COR_{11}$, —$NR_{10}SO_2R_{11}$, —$CONR_9R_{10}$, —$CONHSO_2R_{11}$ or —$SO_2NHCOR_{11}$, in which $R_9$ and $R_{10}$ each represents a hydrogen atom, an aliphatic group, an aromatic group or a heterocyclic group, and $R_{11}$ represents an aliphatic group, an aromatic group or a heterocyclic group and $R_9$ and $R_{10}$ may be combined with each other to form a 5- or 6-membered ring; and wherein $R_1$ and $R_2$, $R_2$ and $R_3$, $R_3$ and $R_4$, $R_5$ and $R_6$, $R_6$ and $R_7$, or $R_7$ and $R_8$ may be combined with each other to form a ring.

Preferred anthraquinone derivatives include 1,4-, 1,5- and 1,8-anthraquinone derivatives shown in Formulas (IX), (X) and (XI) below:

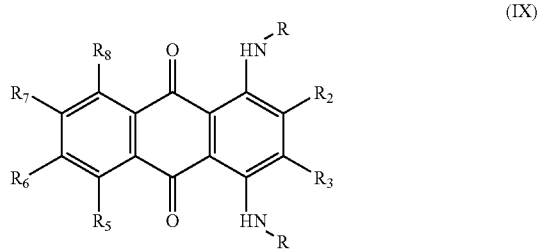

(IX)

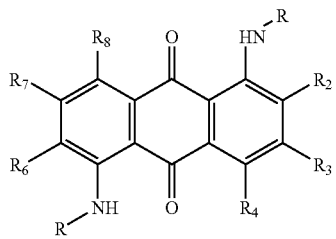

(X)

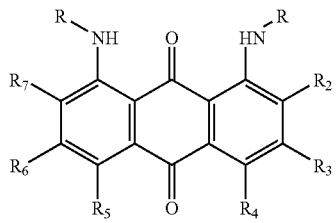

(XI)

wherein $R_2$–$R_7$ are as described above while R is hydrogen, an alkyl group containing 1 to 20 carbon atoms (e.g., methyl, ethyl, n-butyl, isopropyl, 2-ethylhexyl, n-decyl, n-octadecyl), a cycloalkyl group containing 3 to 20 carbon atoms (e.g., cyclopentyl, cyclohexyl), an allyl group containing 3 to 20 carbon atoms, which may contain a substituent(s) including, for example, a halogen atom (e.g., F, Cl, Br, I), a hydroxyl group, a cyano group, a nitro group, a carboxylic acid, an aryl group containing 6 to 10 carbon atoms (e.g., phenyl, naphthyl), an amino group containing 0 to 20 carbon atoms (e.g., —$NH_2$, —$NHCH_3$, —$N(C_2H_5)_2$, —$N(C_4H_9)_2$, —$N(C_8H_{17})_2$, anilino, 4-methoxyanilino), an amido group containing 1 to 20 carbon atoms (e.g., acetylamino, hexanoylamino, benzoylamino, octadecanoylamino), a carbamoyl group containing 1 to 20 carbon atoms (e.g., unsubstituted carbamoyl, methylcarbamoyl, ethylcarbamoyl, octylcarbamoyl, hexadecylcarbamoyl), an ester group containing 2 to 20 carbon atoms (e.g., methoxycarbonyl, ethoxycarbonyl, phenoxycarbonyl, n-butoxycarbonyl, dodecyloxycarbonyl), an alkoxy or aryloxy group containing 1 to 20 carbon atoms (e.g., methoxy, ethoxy, butoxy, iso-propoxy, benzyloxy, phenoxy, octadecyloxy), a sulfonamido group containing 1 to 20 carbon atoms (e.g., methanesulfonamido, ethanesulfonamido, butanesulfonamido, benzenesulfonamido, octanesulfonamido), a sulfamoyl group containing 0 to 20 atoms (e.g., unsubstituted sulfamoyl, methylsulfamoyl, butylsulfamoyl, decylsulfamoyl), a 5- or 6-membered heterocyclic ring (e.g., pyridyl, pyrazolyl, morpholino, piperidino, pyrrolyl, benzoxazolyl), or the like. Some examples of the above 1,4-, 1,5- and 1,8-anthraquinone derivatives include: 1,5- and 1,8-bis(cyclohexylamino) anthraquinone; 1,5- and 1,8-bis (isopropylamino) anthraquinone; 1,4-diisopropylamino-2,3-diphenoxy-9,10-anthracenedione; 1,8-bis(2-ethylhexylamino) anthraquinone; 1,8-bis(N,N-diethylamino-propylamino) anthraquinone; and 1,8-bis(N,N-diethylamino-ethylamino) anthraquinone, and their derivatives, and the like, as well as reaction products and combinations comprising at least one of the foregoing.

Other light absorbing material(s) that may be used in the substrate are benzopyran derivatives having the Formula (XII):

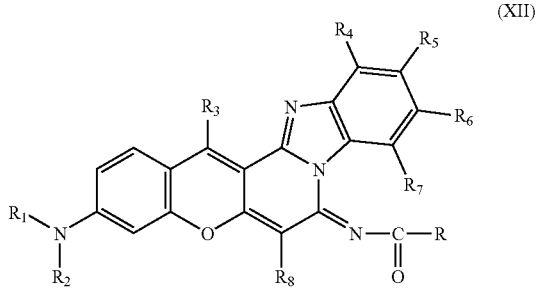

(XII)

where R is an unsubstituted or substituted aryl group (monocyclic, bicyclic, tricyclic or heterocyclic); $R_8$ can be alkoxycarbonyl, nitro, cyano, alkylsulfonyl, benzimidazolyl, benzothiazolyl, benzoxazolyl, or quinoxalinyl; $R_1$ and $R_2$ are hydrogen, unsubstituted or substituted alkyl groups (where the substitution can be $C_1$–$C_{15}$ monovalent hydrocarbyl, alkoxy, cyano, halo, carboxyl, carbalkoxy); and $R_3$ to $R_7$ are selected from the group consisting of hydrogen, an alkyl group containing 1 to 20 carbon atoms, a cycloalkyl group containing 3 to 20 carbon atoms, an allyl group containing 3 to 20 carbon atoms, a hydroxyl group, a cyano group, a nitro group, a carboxylic acid, an aryl group containing 6 to 10 carbon atoms, an amino group containing less than or equal to 20 carbon atoms, an amido group containing 1 to 20 carbon atoms, a carbamoyl group containing 1 to 20 carbon atoms, an ester group containing 2 to 20 carbon atoms, an alkoxy or aryloxy group containing 1 to 20 carbon atoms, a sulfide group containing 1 to 20 carbon atoms, a sulfonamido group containing 1 to 20 carbon atoms, a sulfamoyl group containing less than or equal to 20 atoms, a 5-membered heterocyclic ring, and a 6-membered heterocyclic ring.

An example of benzopyran dye is benzopyran red shown in the Formula (XIII).

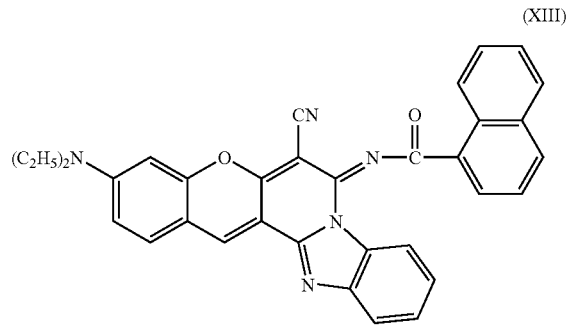

(XIII)

Another light absorbing material that may be used in the substrate is a vat violet dye shown in the Formula (XIV)

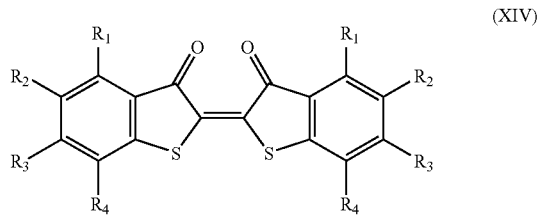

(XIV)

where $R_1$, $R_2$, $R_3$ and $R_4$, may be the same or different and are hydrogen, halogen, alkyl, aryl, alkoxy, alcoyl (for example acyl, benzoyl, or the like), amide, alcohol, nitrile, nitro, ester, ether, and the like. It may be desirable to add the anthraquinone derivatives in combination with either the benzopyran derivatives or the violet vat dyes or both.

Another light absorbing material of the broader anthraquinone dye family is Formula (XV):

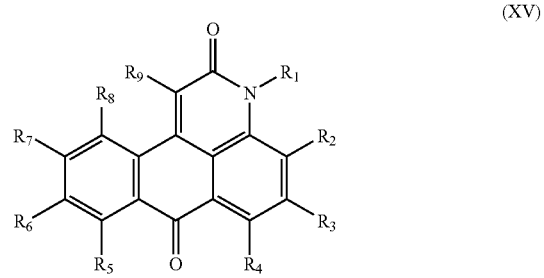

(XV)

An example of such dye family is Solvent Red 52, which is preferably used in control portion formulations with a preferred curing wavelength of about 400 nm (using, for instance, Xenon lamps), Formula (XVI):

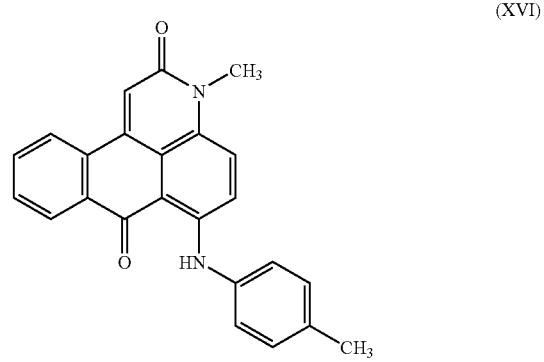

(XVI)

It is desirable for the aforementioned light absorbing material to have a red, magenta or violet shade. Preferably, such light absorbing materials will have a maximum absorption in the range of about 500 and about 630 nm, with a maximum absorption in the range of about 530 to about 600 nm preferred, with the range of about 540 nm to about 590 nm even more preferred. In general, it is desirable for the light absorbing materials to have an extinction coefficient of greater than or equal to 1,500 liters per mole per centimeter ($mol^{-1} \cdot cm^{-1} \cdot L$), preferably greater than or equal to about 3,000 $mol^{-1} \cdot cm^{-1} \cdot L$, more preferably greater than or equal to about 4,500 $mol^{-1} \cdot cm^{-1} \cdot L$, and most preferably greater than or equal to about 6,000 $mol^{-1} \cdot cm^{-1} \cdot L$ at a wavelength of 600 nm. It is also desirable for the light absorbing material to have and extinction coefficient of less than about 1,000 $mol^{-1} \cdot cm^{-1} \cdot L$, preferably less than or equal to about 800 $mol^{-1} \cdot cm^{-1} \cdot L$, and more preferably less than or equal to about 600 $mol^{-1} \cdot cm^{-1} \cdot L$, at a wavelength of about 650 nm. Unless otherwise noted, all extinction coefficients are also measured using a double beam spectrophotometer at a dye concentration yielding a maximum absorption between 0.8 and 1.2 units for a 1 centimeter (cm) path length.

Without being limited to theory, due to the nature of the chromophore of the aforementioned red, magenta and violet light absorbing materials, a higher extinction coefficient is generally achieved at a wavelength of about 600 nm while a lower extinction coefficient is achieved at a wavelength of about 650 nm with a maximum absorption located at a wavelength of greater than or equal to about 520 nm, preferably greater than or equal to about 540 nm, and more preferably greater than or equal to about 560 nm, when in a solution of methylene chloride (also referred to as dichloromethane or $CH_2Cl_2$).

It is generally desirable to add the light absorbing material to the polymeric resin in an amount sufficient to protect the reactive layer from photo-degradation without adversely effecting the read characteristics of the media. Typically, an amount of about 0.001 wt % to about 5.0 wt % light absorbing material can be employed based upon the total weight of the control portion. Within this range, an amount of light absorbing material of less than or equal to about 3 wt %, with less than or equal to about 1 wt % is preferred, less than or equal to about 0.4 wt % more preferred for most light absorbing materials. Also preferred within this range is an amount of light absorbing material of greater than or equal to about 0.05 wt %, with greater than or equal to about 0.07 wt % more preferred, and greater than or equal to about 0.1 wt % especially preferred. The actual amount of dye used in the control portion depends on the efficiency of the dye, i.e., its massic absorptivity at the wavelengths discussed above (e.g., the desired transmission and subsequently blocked wavelength, the control wavelength for photobleaching, and the curing wavelength). In general, it is preferable to use a lower amount of dye to reduce the risk of reactivity between the dye and the resin as well as risks of the dye leach out of the polymer matrix during the molding process ("plate-out" issues).

The control portion can generally be manufactured using a reaction vessel capable of adequately mixing various precursors, such as a single or twin screw extruder, kneader, blender, roll mills, or the like. The polymeric resin together with the light absorbing material may generally be added to the extruder at the feed throat. In one embodiment, the polymeric resin is added to the extruder at the feed throat, while the light absorbing material may be added downstream of the feed throat. While the polymeric resin may be blended with the light absorbing material in the extruder, it may also be desirable to blend the polymeric resin with the light absorbing material directly in a molding machine.

Formation of the storage media can be accomplished using various molding and/or processing techniques. Possible techniques include injection molding, film casting, extrusion, press molding, stamping, and the like. Once the substrate has been produced, additional processing, such as electroplating, coating techniques (spin coating, spray coating, vapor deposition, screen printing, painting, dipping, and the like), lamination, sputtering, and the like, as well as combinations comprising at least one of the foregoing processing techniques, may be employed to dispose desired layers (e.g., including, optionally, the control portion) on the substrate.

An example of a limited play polycarbonate data storage media comprises at least two polymeric substrates, with at least the substrate forming the read side of the data storage media comprising the light absorbing material. Between these two substrates are disposed various layers such as a data layer, dielectric layer(s), a reactive layer(s), a UV layer(s), and semi-reflective and/or reflective layer(s), as well as combinations comprising at least one of the foregoing layers. For example, the layers can comprise, from the substrate, a reflective layer, an optional dielectric layer, a data storage layer(s), an optional dielectric layer, a reactive layer, and the control portion, with an optional protective and/or lubricating layer disposed over the control portion. It is understood that the form of the data storage media is not limited to disk shape, but may be any size and shape which can be accommodated in a readout device. Typical data storage media have an overall thickness of about 1.0 to about 1.3 mm with an outer diameter of about 65 mm to about 130 mm.

In an alternative embodiment, the control portion having the light absorbing material is mixed with an optically transparent plastic (e.g., polycarbonate, polyacrylate, or the like), such that the control portion will be disposed between the reactive layer and the read surface. If the storage media is two sided (i.e., data can be retrieved from both sides of the media), it is preferred that a control portion be disposed on both sides of the reactive media. In other words, it is preferred that the control portion be disposed between the reactive layer and any potential source of photobleaching. The control portion can be a coating having a thickness on the order of Angstroms (Å), for example, about 50 Å (e.g., a coating) to about 1.0 mm or so. The control portion can also be a self-supporting substrate (e.g., a substrate with a sufficient thickness to be self-supporting, such as greater than or equal to about 0.3 mm, with a thickness of about 0.5 mm to about 1.35 mm generally preferred.)). Preferably, the control portion is built in the disk substrate to simplify the disk manufacturing process and also to limit the ability of the end user to alter the control portion.

The data storage layer(s) may comprise any material capable of storing retrievable data, such as an optical layer, magnetic layer, or a magneto-optic layer. The data storage layers may include metals, metal alloys, and oxides that can be sputtered (or otherwise deposited) to form a thin layer of typically less than or equal to about 100 nm and that provides enough reflectivity at the laser readback wavelength to meet disk specifications for the format. Possible materials include oxides (such as silicone oxide), rare earth element—transition metal alloy, nickel, cobalt, chromium, silver, tantalum, platinum, terbium, gadolinium, iron, boron, organic dye(s) (e.g., cyanine or phthalocyanine type dyes), and inorganic phase change compounds (e.g., TeSeSn, InAgSb, and the like), and the like, as well as alloys and combinations comprising at least one of the foregoing. Materials, such as silicon oxide, aluminum, gold, silver, silver alloys, and the like, as well as a combination comprising at least one of these materials, are typically employed due to economic and purity concerns.

The protective layer(s), which protect against dust, oils, and other contaminants, can have a thickness of greater than about 100 micrometers (μm) to less than about 10 Å, with a thickness of about 300 Å or less preferred in some embodiments, and a thickness of about 100 Å or less especially preferred. The thickness of the protective layer(s) is usually determined, at least in part, by the type of read/write mechanism employed, e.g., magnetic, optic, or magneto-optic. Possible protective layers include anti-corrosive materials such as gold, silver, nitrides (e.g., silicon nitrides and aluminum nitrides, among others), carbides (e.g., silicon carbide and others), oxides (e.g., silicon dioxide and others), polymeric materials (e.g., polyacrylates or polycarbonates), carbon film (diamond, diamond-like carbon, and the like), among others, and combinations comprising at least one of the foregoing materials.

The dielectric layer(s), which are disposed on one or both sides of the data storage layer and are often employed as heat controllers, can typically have a thickness of up to or exceeding about 1,000 Å and as low as about 200 Å or less. Possible dielectric layers include nitrides (e.g., silicon nitride, aluminum nitride, and others); oxides (e.g., aluminum oxide); carbides (e.g., silicon carbide); and combinations comprising at least one of the foregoing materials, among other materials compatible within the environment and preferably not reactive with the surrounding layers.

The reflective layer(s) should have a sufficient thickness to reflect a sufficient amount of energy (e.g., light) to enable data retrieval. Typically the reflective layer(s) can have a thickness of up to about 700 Å or so, with a thickness of about 200 Å to about 600 Å generally preferred. Possible reflective layers include any material capable of reflecting the particular energy field, including metals (e.g., aluminum, silver, gold, titanium, and alloys and mixtures comprising at least one of the foregoing metals, and others).

The reactive layer, which comprises both a carrier and a reactive material, should initially have sufficient transmission to enable data retrieval by the media read device, and subsequently form a layer which inhibits data retrieval by that device (e.g., which absorbs a sufficient amount of light (such as, incident and/or reflected light at the wavelength of the laser in the given device)). Typically, a layer that allows an initial percent reflectivity from the reflective layer of greater than or equal to about 45% for DVD-5 and greater than or equal to about 18% for DVD-9 can be employed, with an initial percent reflectivity of greater than or equal to about 50% for DVD-5 and greater than or equal to about 20% for DVD-9 preferred, and an initial percent reflection of greater than or equal to about 55% for DVD-5 and greater than or equal to about 22% for DVD-9 more preferred. Initial reflectivity values of greater than or equal to about 60% for DVD-5 and greater than or equal to about 24% for DVD-9 are even more preferred. Note that reflectivity values for both DVD-5 and DVD-9 refer to the "fully" reflective layer (L1). Due to the construction of a limited play DVD-9, the reflectivity of L0 (i.e., the semi-reflective layer) would not change upon air exposure if it is located between the reactive layer and the read side. Generally, the percent light reflected back to the read device is about 45 to about 85% for a DVD-5 and about 18 to about 30% for a DVD-9, with a percent light reflected back of about 50% to about 80% and about 20% to about 28% especially preferred for DVD-5 and DVD-9 respectively, with about 55% to about 75% and about 22% to about 26% most preferred.

Once the media has been exposed to oxygen (e.g., air), for a desired period of time (e.g., the desired allowable play time of the media), the layer preferably comprises a percent reflectivity that renders the media unreadable. Typically a percent reflectivity for a DVD-5 of less than or equal to about 30% is preferred, with less than or equal to about 20% more preferred, and less than or equal to about 10% especially preferred. A percent reflectivity for a DVD-9 of less than or equal to about 15% is preferred, with less than or equal to about 12% more preferred, and less than or equal to about 10% especially preferred. For most media, a percent reflectivity of less than or equal to about 10% renders the media unbootable and therefore unreadable.

The carrier can be present in an amount of about 65 wt % and about 85 wt %, based upon the total weight of the reactive layer. Within this range, an amount of greater than or equal to about 70 wt % is preferred. Also within this range, an amount of less than or equal to about 80 wt % is also preferred. Possible carriers comprise thermoplastic acrylic polymers, polyester resins, epoxy resins, polythiolenes, UV curable organic resins, polyurethanes, thermosettable acrylic polymers, alkyds, vinyl resins and the like, as well as combinations comprising at least one of the foregoing carriers. Polyesters include, for example, the reaction products of aliphatic dicarboxylic acids including, for example, fumaric or maleic acid with glycols, such as ethylene glycol, propylene glycol, neopentyl glycol, and the like, as well as reaction products and mixtures comprising at least one of the foregoing.

Some epoxy resins, which can be the used as the carrier, include monomeric, dimeric, oligomeric, or polymeric epoxy material containing one or a plurality of epoxy functional groups. Examples include reaction products of bisphenol-A and epichlorohydrin, epichlorohydrin with phenol-formaldehyde resins, and the like. Other organic resins can be in the form of mixtures of polyolefin and polythiols, such as shown by Kehr et al, U.S. Pat. Nos. 3,697,395 and 3,697,402.

The term thermoplastic acrylic polymers, as used herein, is meant to embrace within its scope those thermoplastic polymers resulting from the polymerization of one or more acrylic acid ester monomers as well as methacrylic acid ester monomers. These monomers are represented by the general Formula XVII:

$$CH_2=CWCOOR^f \qquad (XVII)$$

wherein W is hydrogen or a methyl radical and $R^f$ is an alkyl radical, preferably an alkyl radical comprising carbon atoms in a range between about 1 and about 20. Some non-limiting examples of alkyl groups represented by $R^f$ include methyl, ethyl, n-propyl, isopropyl, n-butyl, isobutyl, sec-butyl, tert-butyl, pentyl, isopentyl, hexyl, and the like.

Some non-limiting examples of acrylic acid ester monomers represented by Formula XV include: methyl acrylate, isopropyl acrylate, n-propyl acrylate, n-butyl acrylate, isobutyl acrylate, 2-ethylhexyl acrylate, and the like. Some non-limiting examples of methacrylic acid ester monomers represented by Formula XVII include: methyl methacrylate, ethyl methacrylate, butyl methacrylate, hexyl methacrylate, isobutyl methacrylate, propyl methacrylate, and the like, as well as reaction products and combinations comprising at least one of the foregoing.

Copolymers of the above acrylate and methacrylate monomers are also included within the term thermoplastic acrylic polymers as it appears herein. Preferably, the thermoplastic acrylic polymer is a copolymer of poly(methyl methacrylate/methacrylic acid). The polymerization of the monomeric acrylic acid esters and methacrylic acid esters to provide the thermoplastic acrylic polymers may be accomplished by any of the known polymerization techniques. The thermoplastic acrylic polymers typically have an intrinsic viscosity of less than or equal to about 0.300 centimeters cubed per gram ($cm^3/g$) and more typically, less than or equal to about 0.250 $cm^3/g$, and most typically, less than or equal to about 0.200 $cm^3/g$.

Possible reactive materials include any material capable of producing the above-described percent reflectivities. The reactive layer can comprise a material that undergoes a change in optical properties upon air oxidation, in which the change results in the absorption of light at the laser readback wavelength, thereby resulting in a non-playable disk. Some examples of reactive materials are those of the azine family in their leuco (or reduced) form, e.g., thiazines, oxazines, and the like, as well as their derivatives and combinations comprising at least one of the foregoing, which may include fused ring substituents. Preferably, the reactive material has a maximum absorption located at the laser wavelength ±50 nm, with ±30 nm of the laser wavelength preferred, and ±10 nm of the laser wavelength even more preferred.

For example, oxygen sensitive leuco or reduced forms of methylene blue, brilliant cresyl blue, basic blue 3, and toluidine 0, as well as reaction products and combinations comprising at least one of the foregoing materials can be employed. The structures of some of these materials are set forth as Formulas (XVIII)–(XXI) below:

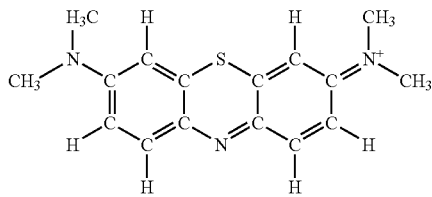

methylene blue (XVIII)

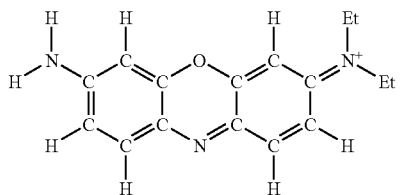

brilliant cresyl blue (XIX)

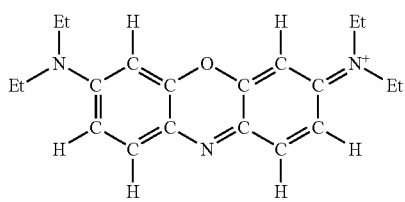

basic blue 3 (XX)

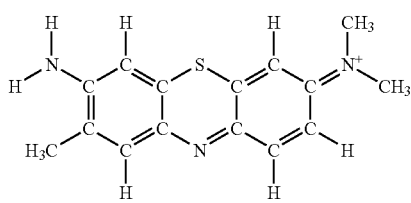

toluidine blue O (XXI)

The reactive materials can further comprise a mixture comprising at least one of the abovementioned reactive materials.

Additionally, the reactive layer may contain photobleaching retardants such as a polyhydroxy compound. Suitable polyhydroxy compounds include biphenols, biphenol derivatives, trihydroxybenzene derivatives, or combinations thereof. The polyhydroxy compound effectively reduces photobleaching. "Effectively reduces photobleaching" as used herein refers to the time it takes to reach a reflectivity at which the limited play storage medium, with a polyhydroxy compound, stops playing in a media player which is more than the time it takes to reach a reflectivity at which the limited play storage medium for data, without a polyhydroxy compound in the reactive layer, stops playing in a media player. Typically, the desired reflectivity is less than about 20%, and more typically, the reflectivity is less than about 10%.

Suitable polydihydroxy compounds include but are not limited to those represented by the Formula (XXII):

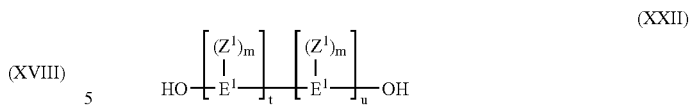

(XXII)

wherein $E^1$ represents an aromatic group such as phenylene, biphenylene, naphthylene, etc. $Z^1$ may be an inorganic atom including, but not limited to, halogen (fluorine, bromine, chlorine, iodine); an inorganic group including, but not limited to, nitro; an organic group including, but not limited to, a monovalent hydrocarbon group such as alkyl, aryl, aralkyl, alkaryl, or cycloalkyl, or an oxy group such as $OR^2$, wherein $R^2$ is a hydrogen or a monovalent hydrocarbon group such as alkyl, aryl, aralkyl, alkaryl, or cycloalkyl. In some particular embodiments $Z^1$ comprises a halo group or $C_1$–$C_6$ alkyl group. The letter "m" represents any integer from and including zero through the number of positions on $E^1$ available for substitution; "t" represents an integer equal to at least one; and "u" represents zero or an integer equal to at least one with the proviso that if "u" is zero, "m" represents any integer from and including two through the number of positions on $E^1$ available for substitution.

When more than one $Z^1$ substituent is present as represented by Formula (VI) above, they may be the same or different. The positions of the hydroxyl groups and $Z^1$ on the aromatic residues $E^1$ can be varied in the ortho, meta, or para positions and the groupings can be in vicinal, asymmetrical or symmetrical relationship, where two or more ring carbon atoms of the aromatic residue are substituted with $Z^1$ and hydroxyl groups.

Examples of polyhydroxy compounds include, but are not limited to 4,4'-biphenol, 3,3'-biphenol, 2,2'-biphenol, 2,2',6,6'-tetramethyl-3,3',5,5'-tetrabromo-4,4'-biphenol, 2,2',6,6'-tetramethyl-3,3',5-tribromo-4,4'-biphenol, 3,3'-dimethylbiphenyl-4,4'-diol, 3,3'-ditert-butylbiphenyl-4,4'-diol, 3,3',5,5'-tetramethylbiphenyl-4,4'-diol, 2,2'-ditert-butyl-5,5'-dimethylbiphenyl-4,4'-diol, 3,3'-ditert-butyl-5,5'-dimethylbiphenyl-4,4'-diol, 3,3',5,5'-tetratert-butylbiphenyl-4,4'-diol, 2,2',3,3',5,5'-hexamethylbiphenyl-4,4'-diol, 2,2',3,3',5,5',6,6'-octamethylbiphenyl-4,4'-diol, 3,3'-di-n-hexylbiphenyl-4,4'-diol, 3,3'-di-n-hexyl-5,5'-dimethylbiphenyl-4,4'-diol, 1,2,4-trihydroxybenzene, and the like. Typically, the polyhydroxy compound is present in a range between about 1 weight % and about 20 weight %, more typically in a range between about 3 weight % and about 15 weight %, and most typically in a range between about 5 weight % and about 10 weight %, based upon the total weight of the reactive layer.

In addition to the above reactive materials, numerous other dyes and light blocking materials can be synthesized to operate to render the data storage media limited play. For example, some other possible reactive materials can be found in U.S. Pat. No. 4,404,257 and U.S. Pat. No. 5,815,484. The reactive materials can further comprise a mixture comprising at least one of any of the above-mentioned reactive materials.

The amount of reactive material in the reactive layer is dependent upon the desired life of the data storage media in combination with the oxygen permeability of the media (i.e., access of oxygen to the reactive layer, e.g., through a UV coating, air channel, or other layer). For a life of up to about 3 days, with a 2 micrometers to about 30 micrometers (μm) thick UV curable coating, the amount of reactive material in the reactive layer can be about 0.1 weight percent (wt %) to about 12 wt %, based upon the total weight of the reactive layer. Within this range, an amount of greater than or equal to about 3 wt % is preferred, with greater than or equal to about 4 wt % more preferred. Also preferred within this range is an amount of less than or equal to about 10 wt %, with less than or equal to about 7 wt % preferred, less than or equal to about 6 wt % more preferred, and less than or equal to about 5 wt % even more preferred. The reactive layer, which is generally placed between the two substrates (one of which is the read side substrate), may assist in the bonding of the two substrates if desired. Note that some additives may accelerate the oxidation kinetics, which translates to a shorter playability time. In a preferred embodiment, the reactive layer is UV curable adhesive with a thickness of about 40 micrometers to about 70 micrometers and is used to bond the disk substrates together. Typically a thickness for the UV curable adhesive of about 55 micrometers is employed. In this case, a disk can be made playable for 48 hours with a reactive dye loading of about 1 weight percent (wt %) to about 2 wt % based upon the total weight of the reactive layer.

In one embodiment of the formation of a data storage media, data is disposed on a side of an original substrate (e.g., a plastic, glass, metal, or other substrate), between the original substrate and a reactive layer. The reactive layer covers a sufficient portion of the data storage media such that it can render the media limited play in a selected amount of time. A control portion is then disposed on a side of the reactive layer opposite the data. The control portion covers a sufficient portion of the reactive layer to provide sufficient protection against photobleaching to inhibit defeatability of the limited play functionality of the reactive layer (e.g., to prevent degradation of the reactive layer). It is understood that the media need only be rendered and retained unreadable (even after exposure to light for a protection period (e.g., greater than or equal to about 7 days)). Optionally, other layers are disposed on the substrate. For example, if the control portion is a coating, it may be desirable to dispose a second, optically clear substrate on the same side of the original substrate as the data, e.g., between the data (e.g., the reflective layer) and the reactive layer, between the reactive layer and the control portion, on a side of the control portion opposite the reactive layer, or the like. Other layers such as additional reflective layer(s), dielectric layer(s), lubricating layer(s), and others can also be employed.

The color of a limited play optical disk can be measured using a color spectrophotometer according standard practice ASTM 1164 and method ASTM E1331; e.g., using a Color Eye 7000A spectrophotometer from Gretag MacBeth, New Windsor, N.Y. can be employed. The instrument, equipped in standard with integrating sphere geometry, is typically used to measure the color of various specimens. Before measurement, the instrument is generally calibrated using the white calibration tile and the light trap provided by the manufacturer. The UV filter position is also typically calibrated according to the MacBeth CE7000A operating manual in order to simulate a D65 light source (UVD65 setting). All measurements (reflectance and transmission mode) are preferably taken with the specular component of light included (SCI), UV included and calibrated (UVD65), a large viewing aperture (LAV), and a large viewing area (LAV). Color coordinates for each specific color space are calculated for a 10 degree observer by the Gretag MacBeth ProPalette Optiview 5.2 software from the spectral curve recorded between 360 nm and 750 nm. The following color spaces are generally used for the calculations:

CIE (Commission Internationale de l'Eclairage) 1931; also referred to as Yxy coordinates;

CIE 1976 or CIELab system (i.e., L*a*b* coordinates) for both transmission and reflectance measurements; and CIE 1976 LCh system (i.e., Lightness (L*), Chroma (C*) and Hue (h°) coordinates) for both transmission and reflectance measurements.

Note that in absence of software, color coordinates could be calculated according to ASTM E308.

In one embodiment, the read side of the limited play disk has a red, violet, or magenta color before exposure to oxygen (or right after opening the sealed package ensuring that the disk is stored in an oxygen-free environment). When expressed in the CIE 1976 LCh system, the limited play disk has originally a lightness value (L*) of less than or equal to 37 and a chroma value (C*) of less than or equal to 46. After becoming unplayable following exposure to oxygen, the limited play disk typically turns to a darker color which, when measured at least one week after the disk (referred hereafter as the "expired" disk) became completely unplayable, corresponds to a lightness value (L*) less than or equal to about 33 and a chroma value less than or equal to about 30. For example, the "expired" disk has a black color corresponding to a lightness value of less than or equal to about 30 and chroma value of less than or equal to about 10, with a chroma value of less than or equal to about 5 being even more preferred.

The following examples, which are meant to be exemplary, not limiting, illustrate compositions and methods of manufacturing related to the various embodiments of the limited play data storage media using various materials and apparatus.

EXAMPLES

For Examples 1–8, the nuclear magnetic resonance (NMR) spectra were recorded using Bruker 300 MHz Avance spectrometer and the ultraviolet (UV)-visual (VIS) spectral measurement was done using Perkin-Elmer Lambda 900 UV/VIS/NIR (near infrared) spectrophotometer. Methylene chloride was employed as the solvent for the UV-VIS spectral measurement. High performance liquid chromatography (HPLC) analysis has been performed on the instrument Agilent 1100. All the melting points were recorded using the instrument Electrothermal MEL-TEMP 3 and are uncorrected. The extinction coefficients were calculated with the Formula (XXIII):

$$\varepsilon = \frac{A}{BC} \quad (XXIII)$$

where: $\varepsilon$=extinction coefficient

A=absorbance

B=path length in cm

C=concentration (molar concentration in moles per liter)

Example 1

This example details the synthesis of 1,5-bis (isopropylamino) anthraquinone. 3.00 grams (g) (0.011 moles (mol)) 1,5-dichloroanthraquinone, 30 milligrams (mg) copper powder, 30 mg copper(I) iodide and 20 milliliter (ml) (0.235 moles) isopropyl amine were added to 30 ml of ethylene glycol and the resulting suspension was heated to 160° C. in a sealed vessel, which was kept in an oil bath. The heating was continued for 16 hours at 160° C., after which the heating was discontinued and the vessel was allowed to attain room temperature. This was followed by the addition of 20 ml of methanol into the vessel and the contents were stirred for thirty minutes at room temperature.

The resulting mixture was then poured slowly into 50 grams (g) of 15% (weight/volume (wt/vol)) ice-cold (i.e., about 5° C.) HCl solution. The precipitate was then filtered, washed free of acid using water and dried under vacuum at 100° C. The yield was 3.00 g. The crude product thus obtained was purified by column-chromatography using an eluent system containing 80% of n-hexane and 20% ethyl acetate. An 80% purity was obtained as determined using HPLC. The product was characterized using proton NMR ($^1$H NMR) spectroscopy (300 megahertz (MHz), deuterated chloroform ($CDCl_3$)) chemical shift ($\delta$) 1.36 (doublet (d), 12 protons (H)), $\delta$ 3.86 (multiplet (m), 2H), $\delta$ 6.99 (d, 2H), $\delta$ 7.53 (m, 4H), $\delta$ 9.75 (proton attached to the nitrogen (NH)).

Example 2

This example details the synthesis of 1,5-bis-(-2-N,N-diethylamino-ethylamino) anthraquinone. A mixture containing 5.50 g (0.02 mole) 1,5-dichloro anthraquinone, 60 mg copper powder, and 20 g (0.17 mole) of N,N-diethylethylenediamine was heated to about 120° C. to about 125° C. at atmospheric pressure (about $10^5$ Pascals (Pa)) for a period of 5 hours. The resulting solution was then cooled to 50° C., following which it was triturated with 40 ml of methanol and stirred for an additional hour at 50° C. The product mass thus obtained was then poured slowly into 100 ml of ice-cold water. The precipitated product was then filtered, washed with water and dried overnight at 50° C. The yield was 6.50 g. A 98% purity was obtained as determined using HPLC. The product was characterized by $^1$H NMR spectroscopy (300 MHz, $CDCl_3$) $\delta$ 1.08 (triplet (t), 12H), $\delta$ 2.65 (quadruplet (q), 8H), $\delta$ 2.82 (m, 4H), $\delta$ 3.40 (m, 4H), $\delta$ 6.98 (d, 2H), $\delta$ 7.54 (m, 4H), $\delta$ 9.75 (NH).

Example 3

This example details the synthesis of 1,8-bis(cyclohexylamino) anthraquinone. A mixture containing 28.00 g (0.101 mol) 1,8-dichloroanthraquinone, 0.3 g copper powder, and 280 ml (2.45 mol) of cyclohexylamine was heated to 160° C. at atmospheric pressure for period of 15 hours. The resulting solution was then cooled to 60° C., following which it was triturated with 150 ml of methanol and stirred for an additional hour at that temperature. The product mass thus obtained was then poured slowly into 1,000 ml of 15% (wt/vol) ice-cold HCl solution. The product that precipitated was then filtered, washed free of acid using water and dried under vacuum at 100° C. The yield was 37.00 g.

The crude product thus obtained was then suspended in 200 ml methanol and refluxed for an hour, after which the mixture was cooled to room temperature. It was filtered, washed with 20 ml of cold methanol (10° C.), and dried under suction. The performance of TLC (thin layer chromatography) at this stage using an eluent system consisting of 90 vol % petroleum ether and 10 vol % ethyl acetate, indicated the presence of a small proportion of the mono-condensed product. The methanol treatment was repeated to remove the mono substituted product completely. The product thus obtained was then dissolved in 4 liters (L) methylene chloride in lots, heated to reflux on each occasion, and filtered through a bed of celite (diatomaceous earth) using a G-2 sintered funnel. The resulting solution was evaporated under reduced pressure to yield 34 g of the pure product; i.e., 98% purity determined by HPLC. The product was characterized by $^1$H NMR spectroscopy (300 MHz, deuterated dichloromethane ($CD_2Cl_2$)) $\delta$ 1.33–2.12 (m, 20H), $\delta$ 3.55 (m, 2H), $\delta$ 7.11 (d, 2H), $\delta$ 7.48 (m, 4H), $\delta$ 9.73 (NH).

Example 4

This example details the synthesis of 1,8-bis(isopropylamino) anthraquinone. A mixture containing 3.00 g (0.011 moles) 1,8-dichloroanthraquinone, 30 mg copper powder, 30 mg of copper (I) iodide and 25 ml (0.29 moles) of isopropyl amine were added to 20 ml (0.34 moles) ethylene glycol and the resulting suspension was heated to 160° C. in a sealed vessel for 15 hours. The resulting solution was then cooled to room temperature (about 23° C.), and the contents were poured slowly into 100 ml of 15% ice-cold acetic acid solution. The product that precipitated was then filtered, washed free of acid and dried under vacuum at 100° C. The yield was 3.00 g. A portion of the sample was then subjected to column-chromatography using a solvent mixture containing 80 volume percent (vol %) of n-hexane and 20 vol % ethyl acetate as the eluent system to yield the product in the pure form. A yield of 34 g was obtained at a 93% purity as determined by HPLC. The product was characterized by $^1$H NMR spectroscopy (300 MHZ, $CDCl_3$) $\delta$ 1.39 (d, 12H), $\delta$ 3.86 (m, 2H), $\delta$ 7.07 (d, 2H), $\delta$ 7.50 (m, 4H), $\delta$ 9.73 (NH).

Example 5

This example details the synthesis of 1,8-bis(2-ethylhexylamino) anthraquinone. 4.00 g (0.014 moles) of 1,8-dichloro anthraquinone, 60 mg of copper powder and 10 g (0.077 moles) of 2-ethylhexylamine were added to 35 ml of ethylene glycol in a flask and the resulting suspension was heated to 160° C. for 16 hours, after which the contents of the flask were allowed to cool to room temperature followed by the addition of 30 ml of methanol and stirring for 30 minutes. The resulting mixture was then poured slowly into 50 g of 15% ice-cold HCl solution. The resulting precipitate was filtered, washed free of acid, and dried under vacuum at 100° C. The yield was 3.50 g. The crude product was then purified by column-chromatography using an eluent system consisting of 80 vol % n-hexane and 20 vol % ethyl acetate. A 93% purity was obtained as determined using HPLC. The product was characterized by $^1$H NMR spectroscopy (300 MHz, deuterated dimethylsulfoxide ($DMSOD_6$)) $\delta$ 0.95 (m, 12H), $\delta$ 1.35–1.72 (m, 18H), $\delta$ 3.22 (m, 4H), $\delta$ 7.05 (d, 2H), $\delta$ 7.50 (m, 4H), $\delta$ 9.73 (NH).

Example 6

This example details the synthesis of 1,8-bis-(3-N,N-dimethylamino-propylamino) anthraquinone. A mixture containing 5.00 g (0.018 mol) 1,8-dichloro anthraquinone, 50 mg copper powder, and 40 g (0.39 mol) of N,N-dimethylamino-3-propylamine was heated to 120° C. at atmospheric pressure for a period of 3 hours. The resulting solution was then cooled to 60° C., triturated using 20 ml of methanol and stirred for 1 hour at that temperature. The product mass thus obtained was then poured slowly into 200 ml of ice cold water. The precipitate thus obtained was then filtered to get 2 g of the product. A portion of the crude sample was then subjected to column-chromatography using a solvent mixture containing 80 vol % of n-hexane and 20 vol % ethyl acetate as the eluent system to yield the product in the pure form. A 98% purity was obtained as determined using HPLC. The product was characterized by $^1$H NMR spectroscopy (300 MHZ, $CDCl_3$) $\delta$ 1.94 (m, 4H), $\delta$ 2.29 (singlet (s), 12H), $\delta$ 2.46 (t, 4H), $\delta$ 3.40 (m, 4H), $\delta$ 7.07 (d, 2H), $\delta$ 7.52 (m, 4H), $\delta$ 9.75(NH).

Example 7

This example details the synthesis of 1,8-bis(-2-N,N-diethylamino-ethylamino) anthraquinone. A mixture containing 10.00 g (0.036 moles) 1,8-dichloroanthraquinone, 0.3 g copper powder, and 60 g (0.51 moles) of N,N-diethylethylenediamine was heated to 130° C. at atmospheric pressure for period of 5 hours. The resulting solution was then cooled to 60° C., following which it was triturated with 25 ml of methanol and stirred for an additional hour at that temperature. The product mass thus obtained was then poured slowly into 100 ml of ice cold water. The product that precipitated was then filtered, washed with water, and dried overnight at 50° C. The total yield was 8.00 g. A 97% purity was obtained as determined using HPLC. The product was characterized by $^1$H NMR spectroscopy (300 MHz, CDCl$_3$) δ 1.11 (t, 12H), δ 2.65 (q, 8H), δ 2.82 (t, 4H), δ 3.40 (m, 4H), δ 7.03 (d, 2H), δ 7.51 (m, 4H), δ 9.72 (NH).

Example 8

This example details the synthesis of benzopyran red. 9.00 g (0.017 mol) of imino compound of the following Formula (XXIV):

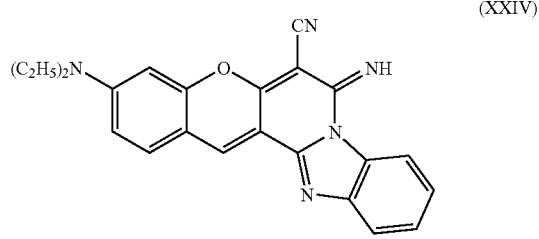

(XXIV)

was dissolved in 150 ml of pyridine by stirring for a period of 30 minutes. 6.4 g (0.0336 mol) of 1-naphthoyl chloride was then added in a thin stream after which the temperature of the reaction mass was maintained at 100° C. for an additional 1.5 hours. Analysis by TLC at this stage using an eluent system as 30 vol % petroleum ether and 70 vol % ethyl acetate, indicated that the reaction had not gone to completion. At this stage, 2.0 g (0.01 mol) of naphthoyl-chloride was added and the heating continued at 100° C. for an additional 30 minutes (min) to ensure complete conversion of the imino compound to the naphthoyl derivative as confirmed by TLC. The product mass was then allowed to cool to room temperature, poured slowly into 800 ml of water under stirring and the stirring continued for 30 min more to effect complete precipitation of the product. The precipitated product was then filtered, washed with 200 ml water, and dried under suction. The crude product was then purified by refluxing in 100 ml of a solvent mixture containing 70 vol % ethyl acetate and 30 vol % petroleum ether for 1 hour, following which the contents were cooled to room temperature, filtered, and washed with 50 ml of petroleum ether. Further purification of the product was effected by refluxing in 100 ml of a solvent mixture containing 50 vol % ethyl acetate and 50 vol % petroleum ether for 1 hour, filtering the contents at room temperature, washing with 50 ml of petroleum ether, and drying overnight under vacuum at 100° C. The product weighed 8.6 g and showed no absorption at 254 nm. A 98% purity was obtained as determined using HPLC. The product was further characterized by $^1$H NMR spectroscopy ((300 MHZ, CDCl$_3$) δ 1.18 (t, 6H), δ 3.6 (q, 4H), δ 6.85 (s, 1H), δ 7.10 (d, 1H), δ 7.39–8.57 (m, 11H), 9.04 (s, 1H), 9.27 (d, 1H)); and IR spectroscopy.

With respect to the HPLC data obtained for Examples 1–8, three methods were employed. All of these methods employed a flow rate of 1 milliliter per minute (ml/min), a column temperature of 25° C. In Method I a employed Zorbax Eclipse XDB-C18 (a HPLC column manufactured by Agilent Technologies, Palo Alto, Calif.), 4.6×150 millimeters (mm), 5 micrometers (μm), and the solvent gradient set forth in Table 2. Method II employed a Zorbax Eclipse XDB-C18, 4.6×150 mm, 5 micrometers, and the solvent gradient set forth in Table 3. Method III employed a Zorbax Eclipse RX-SIL, 4.6×250 mm, 5 micrometers, and the solvent composition of 15 vol % acetonitrile 85 vol % dichloromethane.

TABLE 1

| Example | Type | R | Conc.[1] (millimolar) | $\lambda_{max}$ nm | $\epsilon_{600}$ | $\epsilon_{650}$ | $\epsilon_{500}$ | $\epsilon_{365}$ | $\epsilon_{650}/\epsilon_{600}$ | $\epsilon_{600}/\epsilon_{365}$ | Melting point ° C. |
|---|---|---|---|---|---|---|---|---|---|---|---|
| 1 | XXV | isopropyl (CH$_3$)$_2$CH– | 0.062 | 524 | 878.9 | 0 | 11410.6 | 331.83 | 0.00 | 2.65 | 167–169 |
| 2 | XXV | –CH$_2$N(CH$_3$)CH$_2$CH$_3$ | 0.062 | 522 | 751.6 | 20.96 | 5734.3 | 400 | 2.79 | 1.88 | 162–164 |
| 3 | XXVI | cyclohexyl | 0.062 | 557 | 7975.8 | 405.8 | 14273.54 | 487.9 | 5.09 | 16.34 | 234–236 |
| 4 | XXVI | isopropyl (CH$_3$)$_2$CH– | 0.062 | 553 | 6959.67 | 335.48 | 6443.5 | 658.1 | 4.82 | 10.57 | 179–181 |
| 5 | XXVI | 2-ethylhexyl | 0.054 | 556 | 8409.25 | 507.4 | 6655.55 | 740.74 | 6.03 | 11.35 | — |

TABLE 1-continued

| Example | Type | R | Conc.[1] (millimolar) | $\lambda_{max}$ nm | $\epsilon_{600}$ | $\epsilon_{650}$ | $\epsilon_{500}$ | $\epsilon_{365}$ | $\epsilon_{650}/\epsilon_{600}$ | $\epsilon_{600}/\epsilon_{365}$ | Melting point °C |
|---|---|---|---|---|---|---|---|---|---|---|---|
| 6 | XXVI | 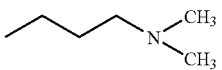 | 0.0636 | 553 | 6900.94 | 121.06 | 6536.16 | 308.17 | 1.75 | 22.39 | 72–74 |
| 7 | XXVI | 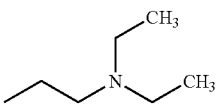 | 0.0653 | 553 | 4442.57 | 68.91 | 4516.08 | 341.5 | 1.55 | 13 | 80–82 |
| 8 | XXVII | — | 0.0223 | 567 | 10126 | 0 | 14589.4 | 11345.5 | 0.00 | 0.89 | 278–280 |
| N/A | XXV | 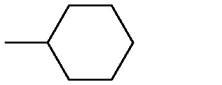 | 0.062 | 528 | 1483.1 | 53.14 | 11410.6 | 288.2 | 3.58 | 5.15 | — |

[1]Conc. = concentration

TABLE 2

| Time | % A | % C | % D |
|---|---|---|---|
| 0.01 | 98 | 1 | 1 |
| 4.0 | 98 | 1 | 1 |
| 12.0 | 50 | 25 | 25 |
| 20.0 | 50 | 25 | 25 |
| 21.0 | 98 | 1 | 1 |
| 30.0 | 98 | 1 | 1 |

A = Water
C = Acetonitrile containing 0.5% triethylamine and adjusted to pH = 7.0 with glacial acetic acid
D = THF

TABLE 3

| Time | % A | % C | % D |
|---|---|---|---|
| 0.01 | 70 | 25 | 5 |
| 12.0 | 0 | 50 | 50 |
| 20.0 | 0 | 50 | 50 |
| 21.0 | 70 | 25 | 5 |
| 30.0 | 70 | 25 | 5 |

A = Water
C = Acetonitrile containing 0.5% triethylamine and adjusted to pH = 7.0 with glacial acetic acid
D = THF Example 9

In this example, several anthraquinone derivatives were prepared and their UV-VIS spectral characteristics were measured in a methylene chloride solution in the wavelength region of 300 nm to 800 nm using a double beam UV/VIS Perkin-Elmer Lambda 900 UV/VIS/NIR spectrophotometer. The structures of the anthraquinone derivatives are shown in Table 4, while the optical properties are shown in Table 1 above.

TABLE 4

| Series | Chemical Structure | [1]Ex. # | Structural details R_1 | R_2 | R_3 |
|---|---|---|---|---|---|
| 1,5-dialkylamino anthraquinone | 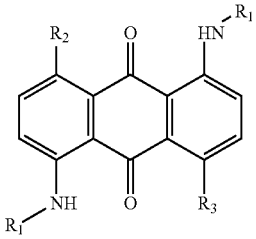 | N/A | cyclohexyl | H | H |
| | | 1 | [2]i-Pr | H | H |
| | | 2 | N,N-diethylaminoethyl | H | H |

TABLE 4-continued

| Series | Chemical Structure | Ex. # | R$_1$ | R$_2$ | R$_3$ |
|---|---|---|---|---|---|
| 1,8-dialkylamino anthraquinone | 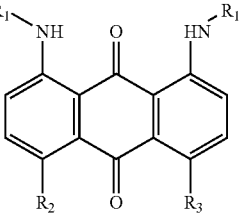 | 3 | cyclohexyl | H | H |
| | | 4 | i-Pr | H | H |
| | | 5 | 2-ethyl hexyl | H | H |
| | | 6 | 3-N,N-dimethylaminopropylamine | H | H |
| | | 7 | N,N-diethylaminoethyl | H | H |
| Benzopyran Red | 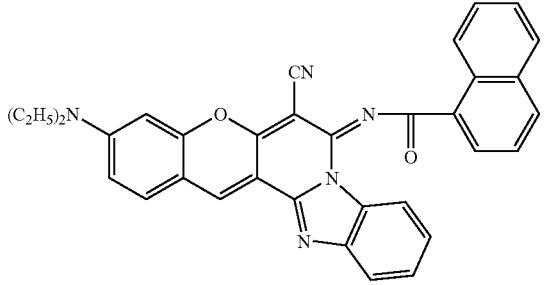 | 8 | — | — | — |

[1]Ex. # = example number
[2]iso-propyl

As may be seen from Table 1, all the anthraquinones exhibit an absorbance ratio greater than or equal to about 1.5 at wavelengths of 600 nm to 365 nm. However, only some of the 1,5-anthraquinones exhibit an absorbance ratio of greater than or equal to about 3 at wavelengths of 600 to 365 mm. Since the 1,8-anthraquinones generally exhibit an absorbance ratio of greater than or equal to about 3 at wavelengths of 600 to 365 nm, these may be preferred over 1,5-anthraquinones in certain specialized applications requiring higher values of absorbance ratios such as optical/ storage media (not limited play) and sensor applications (e.g., sensor windows) where a UV curable adhesive is located on top of a layer that will be traversed by a laser beam or any other source of light like a light emitting diode. 600 and 365 nm are examples of wavelengths. Different curing and readback systems may require different wavelengths. In this respect, Samples No. 7 and 4, which exhibit high absorbance ratios of 22.4 and 16.3 respectively at wavelengths of 600 nm to 365 nm are more preferred.

The absorbance ratio for all of the anthraquinone derivatives at wavelengths of 650 nm to 600 nm is expressed as a percentage and is generally less than 10%. The 1,5-anthraquinone derivatives also show lower extinction coefficients than the 1,8-anthraquinone derivatives at 650 nm. By mixing the 1,5-anthraquinone derivatives with the 1,8-anthraquinone derivatives, it may be possible to fine tune the absorbance ratios to a desirable value. This ability to fine tune the absorbance ratios may be useful when it is desirable to increase the transmission of the media (e.g., the disk substrate) at wavelengths of about 650 nm, while increasing the absorption at wavelengths of about 550 mm.

Example 10

In this example, optical quality compositions (Samples 9–12) were prepared using the formulations shown in Table 5. The 1,8-anthraquinone derivatives were synthesized according to the experimental procedures described previously. Some of the 1,5-derivatives were synthesized as described in the previous sections. Only 1,5-bis(cyclohexylamino)anthraquinone was purchased from Keystone Aniline Corporation (USA), under the color index name of Solvent Red 207. The vat violet dye was also obtained from Keystone Aniline Corporation under the color index name of VAT Violet 3. The benzopyran red from Example 8 was used in Sample 12. The phosphite stabilizer was Doverphos S-9228 from Dover Chemicals, and the mold release agent was Glycerol Monostearate from Mitsubishi International Corporation.

TABLE 5

| | Sample (parts by weight) | | | | |
|---|---|---|---|---|---|
| Composition | 9 | 10 | 11 | 12 | 13 |
| OQ[1] Polycarbonate resin (Average Mw[2] = 17,700 amu) | 100 | 100 | 100 | 100 | 100 |
| Mold release agent | 0.03 | 0.03 | 0.03 | 0.03 | 0.03 |
| Phosphite stabilizer | 0.02 | 0.02 | 0.02 | 0.02 | 0.02 |
| 1,5-anthraquinone derivative from Sample #1 | | | 0.11 | 0.093 | 0.104 |
| 1,8-anthraquinone derivative from Sample #4 | 0.104 | 0.09 | | | |
| Vat Violet 3 | | | | 0.04 | |
| Benzopyran Red | | | | | 0.012 |
| Solvent Red 52 | | | | | 0.3 |
| Disperse Orange 47 | | | | | 0.01 |

[1]OQ = optical quality
[2]Mw = weight average molecular weight

Solvent Red 52 and Disperse Orange 47 were obtained from Bayer Corporation (Pittsburgh, Pa.) under the trade names of Macrolex Red 5B and Orange R, respectively. The compositions shown in Table 5 were then extruded to form 0.60 millimeter thick films with a relative thickness tolerance of +/−10%, which were then used as substrates.

The optical properties of the substrates were measured using a UV-visible double beam spectrophotometer manufactured by Varian Inc., Palo Alto, Calif. (model Cary 300 BIO) in transmission mode. The properties, namely percent transmission (% T) and absorption (Abs) ratio are shown in Table 6. Xenon curing index and Photobleach Filtration index have also been calculated for these samples and are reported in Table 6.

TABLE 6

| Property | Sample | | | | |
|---|---|---|---|---|---|
| | 9 | 10 | 11 | 12 | 13 |
| % T at 365 nm | 64.5 | 62.2 | 41.4 | 45.9 | 0.01 |
| % T at 400 nm | 64.3 | 54.2 | 57.3 | 52.1 | 32.2 |
| % T at 450 nm | 38.6 | 14.3 | 34.4 | 36.9 | 1.7 |
| % T at 500 nm | 9.7 | 0.4 | 7.2 | 8.5 | 0.0 |
| % T at 550 nm | 1.0 | 0.0 | 0.3 | 0.70 | 0.0 |
| % T at 600 nm | 4.4 | 4.5 | 2.9 | 4.8 | 4.3 |
| % T at 650 nm | 78.7 | 82.5 | 77.9 | 79.0 | 86.2 |
| Abs(600 nm)/Abs(365 nm) | 7.1 | 6.5 | 4.0 | 3.5 | 0.3 |
| Abs(600 nm)/Abs(400 nm) | 7.1 | 5.1 | 6.4 | 4.7 | 2.8 |
| Abs(650 nm)/Abs(600 nm) | 0.077 | 0.062 | 0.071 | 0.078 | 0.047 |
| Filtration Index | 4.96 | 6.85 | 5.46 | 5.03 | 6.76 |
| Xenon Curing Index | 67.98 | 60.46 | 51.83 | 52.97 | 12.44 |

The basis for the calculation of the curing index (Equation (1) above) is illustrated in Table 7 for a xenon bulb and a typical Irgacure photoinitiator (Ciba Specialty Chemicals, Tarrytown, N.Y.). The absorbance of the Irgacure photoinitiator was normalized in the range of 330 to 450 nm so that the sum totaled 100. This range of wavelengths was selected because it is typically where curing of an adhesive layer can be performed through a transparent polymer matrix like polycarbonate. The typical spectral irradiance distribution (output) between 330 and 450 nm for a xenon lamp is shown in Table 7. Xenon lamps suitable for the curing of adhesives can be obtained from Xenon Corporation, Woburn, Mass. The efficient lamp energy is calculated by multiplying the lamp output by the normalized efficiency (absorbance) of the initiator for each wavelength. If the efficiency of the photoinitiator is not known, one should use a normalized efficiency value of 0.82645 for each wavelength to simulate a photoinitiator with equal sensitivity from 330 to 450 nm. Additionally, in the absence of data regarding the lamp output of the curing lamp, the Xenon lamp output energy presented in Table 7 should be used as a default value for the calculation of the efficient lamp energy.

TABLE 7

| Wavelength (nm) | Xenon lamp output W/cm2/nm | Irgacure Normalized Efficiency | Efficient Lamp Energy (W/cm2/nm) |
|---|---|---|---|
| 330 | 0.4583 | 1.5257 | 0.6993 |
| 331 | 0.4680 | 1.5045 | 0.7040 |
| 332 | 0.4776 | 1.4833 | 0.7084 |
| 333 | 0.4872 | 1.4620 | 0.7124 |
| 334 | 0.4969 | 1.4408 | 0.7159 |
| 335 | 0.5065 | 1.4196 | 0.7190 |
| 336 | 0.5161 | 1.3983 | 0.7217 |
| 337 | 0.5258 | 1.3771 | 0.7241 |
| 338 | 0.5354 | 1.3559 | 0.7260 |
| 339 | 0.5451 | 1.3347 | 0.7275 |
| 340 | 0.5547 | 1.3134 | 0.7285 |
| 341 | 0.5643 | 1.2922 | 0.7292 |
| 342 | 0.5740 | 1.2710 | 0.7295 |
| 343 | 0.5836 | 1.2498 | 0.7293 |
| 344 | 0.5932 | 1.2285 | 0.7288 |
| 345 | 0.6029 | 1.2073 | 0.7278 |
| 346 | 0.6125 | 1.1861 | 0.7265 |
| 347 | 0.6221 | 1.1648 | 0.7247 |
| 348 | 0.6318 | 1.1436 | 0.7225 |
| 349 | 0.6414 | 1.1224 | 0.7199 |
| 350 | 0.6510 | 1.1012 | 0.7169 |
| 351 | 0.6607 | 1.0799 | 0.7135 |
| 352 | 0.6703 | 1.0587 | 0.7097 |
| 353 | 0.6799 | 1.0375 | 0.7054 |
| 354 | 0.6896 | 1.0163 | 0.7008 |
| 355 | 0.6992 | 0.9950 | 0.6957 |
| 356 | 0.7089 | 1.0157 | 0.7200 |
| 357 | 0.7185 | 1.0363 | 0.7446 |
| 358 | 0.7281 | 1.0569 | 0.7696 |
| 359 | 0.7378 | 1.0776 | 0.7950 |
| 360 | 0.7474 | 1.0982 | 0.8208 |
| 361 | 0.7570 | 1.1189 | 0.8470 |
| 362 | 0.7667 | 1.1395 | 0.8736 |
| 363 | 0.7763 | 1.1601 | 0.9006 |
| 364 | 0.7859 | 1.1808 | 0.9280 |
| 365 | 0.7956 | 1.2014 | 0.9558 |
| 366 | 0.8052 | 1.2220 | 0.9840 |
| 367 | 0.8148 | 1.2427 | 1.0126 |
| 368 | 0.8245 | 1.2633 | 1.0416 |
| 369 | 0.8341 | 1.2840 | 1.0710 |
| 370 | 0.8438 | 1.3046 | 1.1007 |
| 371 | 0.8493 | 1.2921 | 1.0974 |
| 372 | 0.8549 | 1.2795 | 1.0938 |
| 373 | 0.8604 | 1.2670 | 1.0901 |
| 374 | 0.8660 | 1.2545 | 1.0863 |
| 375 | 0.8715 | 1.2419 | 1.0824 |
| 376 | 0.8771 | 1.2294 | 1.0783 |
| 377 | 0.8826 | 1.2169 | 1.0741 |
| 378 | 0.8882 | 1.2043 | 1.0697 |
| 379 | 0.8938 | 1.1918 | 1.0652 |
| 380 | 0.8993 | 1.1793 | 1.0605 |
| 381 | 0.9049 | 1.1668 | 1.0558 |
| 382 | 0.9104 | 1.1542 | 1.0508 |
| 383 | 0.9160 | 1.1417 | 1.0458 |
| 384 | 0.9215 | 1.1292 | 1.0406 |
| 385 | 0.9271 | 1.1166 | 1.0352 |
| 386 | 0.9326 | 1.1041 | 1.0297 |
| 387 | 0.9382 | 1.0916 | 1.0241 |
| 388 | 0.9438 | 1.0790 | 1.0184 |
| 389 | 0.9493 | 1.0665 | 1.0125 |
| 390 | 0.9549 | 1.0540 | 1.0064 |
| 391 | 0.9604 | 1.0415 | 1.0002 |
| 392 | 0.9660 | 1.0289 | 0.9939 |
| 393 | 0.9715 | 1.0164 | 0.9875 |
| 394 | 0.9771 | 1.0039 | 0.9809 |
| 395 | 0.9826 | 0.9913 | 0.9741 |
| 396 | 0.9882 | 0.9788 | 0.9673 |
| 397 | 0.9938 | 0.9663 | 0.9602 |
| 398 | 0.9993 | 0.9538 | 0.9531 |
| 399 | 1.0049 | 0.9412 | 0.9458 |
| 400 | 1.0104 | 0.9287 | 0.9384 |
| 401 | 1.0160 | 0.8999 | 0.9143 |
| 402 | 1.0215 | 0.8712 | 0.8900 |
| 403 | 1.0271 | 0.8425 | 0.8653 |
| 404 | 1.0326 | 0.8137 | 0.8403 |
| 405 | 1.0382 | 0.7850 | 0.8149 |
| 406 | 1.0438 | 0.7562 | 0.7893 |
| 407 | 1.0493 | 0.7275 | 0.7633 |
| 408 | 1.0549 | 0.6987 | 0.7371 |
| 409 | 1.0604 | 0.6700 | 0.7105 |
| 410 | 1.0660 | 0.6412 | 0.6835 |
| 411 | 1.0715 | 0.6125 | 0.6563 |
| 412 | 1.0771 | 0.5837 | 0.6287 |
| 413 | 1.0826 | 0.5550 | 0.6009 |
| 414 | 1.0882 | 0.5263 | 0.5727 |
| 415 | 1.0938 | 0.4975 | 0.5442 |
| 416 | 1.0958 | 0.4688 | 0.5137 |
| 417 | 1.0979 | 0.4400 | 0.4831 |

TABLE 7-continued

| Wavelength (nm) | Xenon lamp output W/cm2/nm | Irgacure Normalized Efficiency | Efficient Lamp Energy (W/cm2/nm) |
|---|---|---|---|
| 418 | 1.1000 | 0.4113 | 0.4524 |
| 419 | 1.1021 | 0.3825 | 0.4216 |
| 420 | 1.1042 | 0.3538 | 0.3906 |
| 421 | 1.1063 | 0.3250 | 0.3596 |
| 422 | 1.1083 | 0.2963 | 0.3284 |
| 423 | 1.1104 | 0.2676 | 0.2971 |
| 424 | 1.1125 | 0.2388 | 0.2657 |
| 425 | 1.1146 | 0.2101 | 0.2341 |
| 426 | 1.1167 | 0.1813 | 0.2025 |
| 427 | 1.1188 | 0.1526 | 0.1707 |
| 428 | 1.1208 | 0.1238 | 0.1388 |
| 429 | 1.1229 | 0.0951 | 0.1068 |
| 430 | 1.1250 | 0.0663 | 0.0746 |
| 431 | 1.1271 | 0.0697 | 0.0785 |
| 432 | 1.1292 | 0.0730 | 0.0824 |
| 433 | 1.1313 | 0.0763 | 0.0863 |
| 434 | 1.1333 | 0.0796 | 0.0902 |
| 435 | 1.1354 | 0.0829 | 0.0941 |
| 436 | 1.1375 | 0.0862 | 0.0981 |
| 437 | 1.1396 | 0.0896 | 0.1021 |
| 438 | 1.1417 | 0.0929 | 0.1060 |
| 439 | 1.1438 | 0.0962 | 0.1100 |
| 440 | 1.1458 | 0.0995 | 0.1140 |
| 441 | 1.1479 | 0.1028 | 0.1180 |
| 442 | 1.1500 | 0.1061 | 0.1221 |
| 443 | 1.1521 | 0.1095 | 0.1261 |
| 444 | 1.1542 | 0.1128 | 0.1302 |
| 445 | 1.1563 | 0.1161 | 0.1342 |
| 446 | 1.1583 | 0.1194 | 0.1383 |
| 447 | 1.1604 | 0.1227 | 0.1424 |
| 448 | 1.1625 | 0.1260 | 0.1465 |
| 449 | 1.1646 | 0.1294 | 0.1506 |
| 450 | 1.1667 | 0.1327 | 0.1548 |

From Table 6, it may be seen that for all the samples, the absorbance ratio at wavelengths of 600 nm to 365 nm or at 600 nm to 400 nm is greater than or equal to about 2; actually, it is greater than or equal to about 2.5, with greater than or equal to about 5 preferred and obtained. The absorbance ratio at wavelengths of 650 nm to 600 nm for all samples is less than or equal to about 0.15, actually, it is less than or equal to 0.10, with greater than or equal to about 0.075 preferred and obtained. All samples display a transmissivity greater than 70% at a wavelength of 650 nm, a transmissivity of less than about 30% at a wavelength of 600 nanometers (actually of less than or equal to about 10%), and a transmissivity of less than about 5% at a wavelength of 550 nanometers (actually of less than or equal to about 2%). Note that samples 9 to 13 also exhibit a Xenon curing index greater than about or equally to about 0.5; the curing index is actually greater than 5 for all samples, with even greater than 10 preferred and obtained. In addition, samples 9 to 13 exhibit a photobleach filtration index (also see Equation (2) above) greater than or equal to about 2.5, with greater than or equal to about 4.0 preferred and obtained and with greater than 5.0 more preferred and obtained.

Example 11

In this example, Sample No. 10 from Example 10 was extruded on a melt filtered line equipped with filters of 10 micrometer porosity in a facility having a controlled atmosphere ("class 100" cleanliness rating) facility in order to produce true optical quality resin suitable for molding optical data storage media (DVD) substrates in high yield. The extruder was a Type ZSK-30 (i.e., 30 mm extruder) commercially available from Werner and Pfleiderer, New Jersey. The extrusion conditions were: Zone 1=480° F./Zone 2=500° F./Zone 3=520° F./Zone 4=540° F./Zone 5=550° F./Die head=550° F./Screw speed: 400 to 450 revolutions per minute (rpm).

DVD-5 disks were produced from the pelletized material using standard procedure. Both L0 and L1 substrates were molded from the same pelletized material corresponding to the composition described in Sample 10 from Example 10. Daicure SD-698 UV curable adhesive was used to bond the disk substrates. (Note, both of the L0 and L1 substrates were made from this material, with the composition of the finished discs subjected to complete electrical (AudioDev DVDPro SA300 Pulsetech Drive from AudioDev USA, Woodland Hills, Calif.) and mechanical (Dr. Schenk PROmeteus MT136 from Dr. Schenk, Woodbury, Minn.) testing. The detailed results of the testing are reported in Table 8:

TABLE 8

| Parameter | Lower Spec Limit | Upper Spec Limit | Mean | Standard Deviation |
|---|---|---|---|---|
| Radial Tilt Min[1] (degrees) | −0.8 | 0.8 | −0.120 | 0.195 |
| Radial Tilt Max[2] (degrees) | −0.8 | 0.8 | 0.497 | 0.222 |
| Radial Tilt Average (degrees) | −0.8 | 0.8 | 0.240 | 0.197 |
| Relative Birefringence Min (DP[3]; nm) | −100 | 100 | −51.300 | 1.889 |
| Relative Birefringence Max (DP; nm) | −100 | 100 | 72.100 | 2.183 |
| Tangential Tilt Max (degrees) | −0.3 | 0.3 | 0.190 | 0.053 |
| Vertical Deviation OD[4] (μm) | −300 | 300 | 149.400 | 74.657 |
| Vertical Runout Max | −300 | 300 | 72.500 | 29.617 |
| L0 Electrical Measurements | | | | |
| PI Errors | — | 280 | 16.670 | 19.042 |
| PI Error Max | — | 280 | 53.767 | 68.568 |
| PI Failures | — | 50 | 1.093 | 1.711 |
| PI Failures Max | — | 50 | 9.333 | 2.341 |
| PO Failures | — | 0 | 0.000 | 0.000 |
| PO Failures Max | — | 0 | 0.000 | 0.000 |
| PI Sum 8 | — | 280 | 19.631 | 21.133 |
| PI Sum 8 Max | — | 280 | 62.167 | 79.746 |
| Tangential Push Pull (TPP) | — | 0.9 | 0.149 | 0.033 |
| Radial Noise (RN) | — | 16 | 5.561 | 0.697 |
| I14/I14H Min | 0.65 | — | 0.808 | 0.017 |
| I14/I14H Average | 0.65 | — | 0.839 | 0.026 |
| R14H Min | 45 | 85 | 47.846 | 0.722 |
| R14H Average | 45 | 85 | 54.902 | 2.329 |
| DC Jitter Average | — | 8 | 8.884 | 0.900 |
| I3/I14 Min | 0.15 | — | 0.218 | 0.019 |
| I3/I14 Average | 0.15 | — | 0.271 | 0.026 |
| Asymmetry (ASYM) | −5 | 15 | 7.973 | 0.822 |

[1]Min. = minimum
[2]Max = maximum
[3]DP = double pass
[4]OD = outer diameter

The parameters listed in Table 8 correspond to standard parameters specified for DVD disks as detailed in the Industry Standard ECMA publication number 267 ("120 mm DVD Read Only disk 3rd edition", April 2001 available online at www.ecma-international.org). The optical/mechanical parameters were measured using the Dr. Schenk PROmeteus MT136. The electrical parameters were measured using the AudioDev DVD Pro SA300 PulseTech drive.

In order to further demonstrate the potential of the compositions to provide photo bleaching protection of limited play optical data storage media, the substrates prepared from the compositions (Samples 9–12) were disposed atop a used limited play optical data storage discs (DVD) having clear substrates and exposed to an accelerated weathering test. A clear optical quality film was used as the control. Testing was conducted in a Weather-o-Meter (W-o-M) model Ci4000 produced by Atlas (Chicago, Ill.). The W-o-M settings set forth in Table 9 "accelerated weathering", wherein about 2.86 hours (hrs.) in the W-o-M (i.e., 2.86 hours of accelerated weathering) is equivalent to 1 day outdoor south sunlight exposure in Florida. The settings in Table 9 were used to test the photobleach resistance of a limited-play disk after it became unplayable. The disk was exposed to oxygen (e.g., air) in order to oxidize the reactive layer until the reflectivity reached a value of 10%, the disk was then stored for one week in the presence of oxygen before testing in the W-o-M. The disk was stored in the absence of light to avoid the risk of altering the accelerated weathering results (pre-exposure to light/defeating wavelengths). The testing in the W-o-M was for a period of about 80 hrs (80 hours of accelerated weathering) to simulate up to about 28 days of outdoor south sunlight exposure in Florida. The disk was pulled out of the W-o-M in order to measure disk reflectivity after about 20 hrs of accelerated weathering (simulating about 7 days of outdoor south sunlight exposure in Florida) and then placed again in the W-o-M for about another 20 hrs (total exposure of about 40 hrs of accelerated weathering, simulating about 14 days of outdoor south sunlight exposure in Florida). After measuring reflectivity, the disk was placed again in the W-o-M for about another 40 hrs totaling about 80 hrs of accelerated weathering (simulating about 28 days of outdoor south sunlight exposure in Florida) and finally removed to measure disk reflectivity after about 80 hrs exposure in the W-o-M.

TABLE 9

| Hardware: | Ci4000 Weather-o-Meter |
|---|---|
| Irradiance | 0.75 watts/m$^2$ measured at 340 nm |
| light/no spray | 100% Light On |
| dark/dry | N/A |
| dark/spray | N/A |
| light/spray | N/A |
| black panel | 55° C. |
| dry bulb | 35° C. |
| Relative Humidity at 55° C. | 30% |
| inner filter | CIRA* |
| outer filter | Sodalime* |

*CIRA and sodalime filters are available from Atlas, Chicago, IL.

Disk reflectivity at 650 nm was measured with in a Dr Schenk Prometheus 136 testing machine (commercially available from Dr Schenk, Woodbury, Minn.). The reflectivity of a reference disk reached about 22% at a wavelength of 650 nm after only 20 hrs. exposure in the W-o-M. For the optical data storage discs protected by the compositions of Samples 9–12, it took about 80 hours to reach the same level of reflectivity as the disk protected by the control sample; i.e., to be photobleached to a point where the reflectivity increased to about 22% at a wavelength of 650 nm. Knowing that the most sensitive DVD players can read discs with reflectivity values as low as 10%, the compositions are capable of providing significant extra protection against photobleaching translating to at least 2 weeks of sunlight exposure in Florida (i.e., the disk remains unreadable (less than 10% reflectivity (greater than 90% absorbance)) with greater than or equal to the equivalent of 14 days of south sunlight exposure in Florida or an exposure of about 40 hrs. of accelerated weathering (e.g., in the W-o-M at the conditions set forth in Table 9)). It is further noted that the control portion, and preferably the light absorbing material, has a light transmission of greater than or equal to about 70% at 650 nm initially and a decrease in the initial light transmission, at 650 nm, after 160 hrs accelerated weathering, of greater than or equal to about 5%, with greater than or equal to about 10% preferred. Also preferred is a decrease light transmission of greater than or equal to 2% at 650 nm initially after 80 hrs accelerated weathering, with greater than or equal to about 5% more preferred, and greater than or equal to about 10% more preferred.

As may be seen from the above examples, compositions comprising plastic and a light absorbing material having a transmissivity of greater than or equal to 70% at a wavelength of 650 nanometers, less than or equal to about 30% at a wavelength of 600 nanometers, and less than or equal to about 5% at a wavelength of 550 nanometers may be used to provide photobleach protection for optical data storage media such as DVDs. The composition also has a absorbance ratio of greater than or equal to about 2 for wavelengths of 600 nm to 365 nm (or 600 nm to 400 nm), preferably greater than or equal to about 3, more preferably greater than or equal to about 5, and even more preferably greater than or equal to about 10.

In general, the compositions ability to provide high photobleach filtration index, results in efficient protection of the reactive layer used in the optical data storage media. When combined with high absorbance ratios at wavelengths of 600 nm to 365 nm or 600 nm to 400 nm, the control portion allows enough radiations to penetrate at wavelengths used to achieve the curing of the adhesive layer (i.e., typically about 365 nm or 400 nm). These compositions when molded into read side substrates of about 0.1 to about 1.0 millimeter thickness for optical data storage media are capable of providing protection against photobleaching for greater than or equal to about 48 hours with greater than or equal to about 1 week possible, greater than or equal to about 2 weeks readily attainable, and greater than or equal to about 4 weeks of photobleaching protection from direct sunlight possible. Additionally, since the composition displays a limited absorption ratio of less than or equal to about 0.1 at wavelengths of about 650 run to about 600 nm, it does not significantly disrupt the laser readback wavelength by filtering the laser.

Example 12

Property Determination of a Storage Media

Limited play functionality of a storage media can be determined by various methods. One method of determining limited play functionality of a storage media includes removing the disk from its package and measuring the initial reflectivity at the laser wavelength (e.g., 650 nm for DVDs) using an optical media inspection system such as a PROMeteus DVD tester (e.g., PROMeteus model 146 from Dr. Schenk) in the case of DVDs. Disk reflectivity can then be measured as a function of time after incremental exposure to oxygen. If disk reflectivity drops with increased exposure to oxygen, it is an indication of the presence of a reactive layer limiting the time data can be accessed on the disk. The fact that disk reflectivity can be measured with an optical media inspection system indicates that the disk contains a reflective layer.

In most disk constructions, this reflective layer is visible by the human eye. If not visible to the human eye, optical or electronic microscopy techniques can be used to determine the presence of the reflective layer. In some instances, Scanning Electron Microscopy coupled to Energy Dispersive X-ray Spectroscopy can be used to provide additional information such as elemental composition regarding the reflective layer (and the semi-reflective layer, if applicable). Note, when the control portion is isolated from the other layers (see below), the reactive layer may be directly accessible and can be analyzed by ATR spectroscopy in order to provide both qualitative and quantitative information about its composition.

One way to locate the various layers of a storage media with regard to one another is to look at a cross-section of the media, e.g., the disk. Optical microscopy or SEM may be used to clearly identify the different layers. In some instances, it is easier to compare the cross-section of a disk before exposure to oxygen and after it becomes unplayable because the reactive layer usually changes color upon exposure to oxygen and can therefore be located more easily. Note that Attenuated Total Reflectance (ATR) spectroscopy in the ultraviolet (UV), visible (Vis), near infrared (NIR), or infrared range, can be used to verify that the reactive layer is not located on the outer surface of the disk. This technique, which is typically used to analyze the surface of materials, would be used to compare for instance disks prior to and after exposure to oxygen. If the reactive layer were located on the outer surface of the disk, ATR spectroscopy would detect significant changes in the spectral response.

Determination of the nature of the control portion is preferably accomplished when the control portion is isolated from the rest of the media; it is preferable to analyze the control portion before it is attached (e.g., bonded), to the other layers. Otherwise, the control portion is preferably mechanically detached from the other layers prior to analysis to determine light transmission at the laser wavelength. A double beam UV/Vis or UV/Vis/NIR spectrophotometer (such as, for example, a Cary 300 instrument from Varian) can be used to confirm the percent transmission of the light at the laser wavelength (e.g., 650 nm for DVDs). From the spectral data of the control portion recorded by the spectrophotometer in transmission mode, the curing and filtration indices can be calculated as illustrated in Example 10 above.

Determination of molar extinction coefficient of the light absorbing material(s) in the control portion is measured in methylene chloride solution. Various methods of determining this coefficient can be employed. For example, the nature of the light absorbing materials in the polymeric resin can be identified. In the simplest case, the spectral data generated previously for the calculation of the light transmission, curing, and filtration indices are sufficient to identify the exact chemical nature (and possibly the loading) of each light absorbing material. If the spectral data in the solid state does not allow identification of the light absorbing material(s), the control portion can be dissolved in methylene chloride for further analysis. Techniques including liquid chromatography (LC), high performance liquid chromatography (HPLC), gel permeation chromatography (GPC), gas chromatography (GC), Nuclear Magnetic Resonance (NMR), or UV/Vis/NIR spectroscopy can be used, alone or in combination, to identify the nature and/or loading of the light absorbing material(s). Combined techniques such as LC/MS (Liquid Chromatography/Mass Spectrometry) or GC/MS (Gas Chromatography/Mass Spectrometry) may be used to access additional details regarding the nature and/or molecular weight of the light absorbing material(s). Additionally, calibration curve(s) may be built for the particular analytical technique used to determine the actual loading of light absorbing material(s), or characterization or loading determination could involve quantitative chromatographic separation (such as preparative high performance liquid chromatography) in order to fully isolate the light absorbing material for analysis.

When the light absorbing material is isolated from the other components of the control portion, it is possible to evaporate the solvent and weigh the light absorbing material(s) to calculate its original loading in the control portion. When the light absorbing material(s) are isolated, it is possible to use analytical techniques such as Mass Spectrometry to obtain, at a minimum, the molecular weight of the compound and possibly a chemical formula. At this point, the extinction coefficients can be easily measured by re-dissolving the light absorbing material in a known a amount of methylene chloride and by recording the spectral data using a UV/V is or UV/Vis/NR double beam spectrophotometer.

If the light absorbing material(s) are identified, molar extinction coefficients can be either retrieved from historical data or re-measured starting from a solution of the pure light absorbing material in methylene chloride. As explained herein, a double beam spectrophotometer is typically used to record the spectral data of the solution of light absorbing material at a dilution corresponding to an absorbance value (optical density) of 0.8 to 1.2 units unless material solubility is a problem. Extinction coefficients can then be easily calculated using Beer's law knowing the molecular weight of each dye and how much was used in the solution to yield the recorded absorbance at the specific wavelength.

If several unknown light absorbing materials are present in the control portion but cannot be separated from one another for identification (or for separate determination of the extinction coefficients) then the determination of an average molecular weight and average extinction coefficients is possible. The average molecular weight of the light absorbing material can be calculated using data from GC/MS experiments, GPC, or other techniques. Of course, the average needs to reflect the relative concentration of each light absorbing material as best estimated from the available analytical data. Extinction coefficients determination in this case is similar to the calculations for a single separate light absorbing material with the difference that the combined (or total) weight of light absorbing material and the average molecular weight is used to calculate the molar concentration of light absorbing materials in the methylene chloride solution.

Generally, it has been discovered that, in optical media, limited play functionality can be defeated by exposing the media to high intensity light (e.g., direct sunlight) for extended periods of time (typically up to about a week). The exposure to the sunlight degrades the reactive layer (e.g., the reactive layer comprises a derivative of leuco methylene blue, which gradually oxidizes upon exposure to oxygen and becomes light absorbing at a readback laser wavelength) such that it is no longer light absorbing at the readback laser wavelength. In other words, a reactive material that is initially light transparent at a readback laser wavelength is disposed between a reflective layer and a read surface of a storage media. A control portion (e.g., a substrate, layer, and/or coating) is disposed between the reactive material and the read surface. Once the media packaging is opened, the reactive material begins to react (e.g., with oxygen), decreasing its light transmissivity at the readback laser wavelength. Eventually, the media becomes unreadable (i.e., the data can not be retrieved from the media due to the absorption of the laser light by the reactive material).

In order to prevent the limited play capability of the media from being defeated by prolonged exposure of the media to high intensity light (e.g., sunlight), the control portion is used. The control portion has a transmissivity at the readback laser wavelength of greater than or equal to about 60%, with greater than or equal to about 70% preferred, greater than or equal to about 78% more preferred, and greater than or equal to about 82% even more preferred. The control portion also has an absorbance ratio at the key control wavelength (e.g., 600 nm) to the curing wavelength (e.g., 365 nm or 400 nm) of greater than or equal to about 2, with greater than or equal to about 3 preferred, and greater than or equal to about 5 more preferred, and greater than or equal to about 10 most preferred. Preferably, the control portion has a transmission at the high intensity light wavelength (e.g., at the wavelength of the light employed to defeat the limited play functionality (the defeating wavelength)), of less than or equal to about 30%, with less than or equal to about 20% more preferred, and less than or equal to about 10% even more preferred, and less than or equal to about 5% most preferred. In most cases, the limited play functionality can be defeated in a relatively broad range of wavelengths. In this case or when the actual defeating wavelength cannot be clearly identified, it is preferable to select the defeating wavelength (or key control wavelength) 50 nm below the laser wavelength (e.g., 600 nm for a laser wavelength of 650 nm).

Another advantage to the present media and the use of the light absorbing material(s) is that some of these materials can enhance the limited playability of the media. In other words, the light absorbing materials cause the control portion to have a reduced percent transmission over time (e.g., after exposure to the defeating wavelength). These light absorbing materials can provide intrinsic defeatability protection. An example of such material is 1,8-bis (cyclohexylamino)anthraquinone. When used as a light absorbing material in a polycarbonate resin based substrate, light transmission at 650 nm decreases as the exposure time to direct sunlight increases.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A limited play optical storage medium for data, comprising:
    a reflective layer;
    a control portion comprising an optically transparent polymeric resin and a light absorbing material, wherein the control portion has a light transmission of greater than or equal to about 70% at 650 nm, a curing index of greater than or equal to about 0.1 and a filtration index of greater than or equal to about 2.5, and wherein the light absorbing material has a minimum extinction coefficient (measured in $CH_2Cl_2$ solution) at 600 nm of greater than or equal to 1,500 $mol^{-1} \cdot cm^{-1} \cdot L$, a maximum extinction coefficient (measured in $CH_2Cl_2$ solution) at 650 nm of less than about 1,000 $mol^{-1} \cdot cm^{-1} \cdot L$, a ratio of extinction coefficient at 650 nm to 600 nm less than about 0.1; and
    a reactive layer disposed between the reflective layer and the control portion, wherein the reactive layer is designed to limit the time during which data on the medium (disposed on a side of the reactive layer opposite the control portion), can be accessed after exposure to oxygen.

2. The storage medium of claim 1, further comprising a substrate is disposed on a side of the reflective layer opposite the control portion.

3. The storage medium of claim 2, wherein the control portion has at least one of an absorbance ratio at (600 nm to 365 nm) or an absorbance ratio at (600 nm to 400 nm) of greater than or equal to about 2.

4. The storage medium of claim 3, wherein the control portion has at least one of an absorbance ratio at (600 nm to 365 nm) or an absorbance ratio at (600 nm to 400 nm) is greater than or equal to about 5.

5. The storage medium of claim 2, further comprising a semi-reflective layer disposed between the reflective layer and the control portion.

6. The storage medium of claim 5, wherein the reactive layer is disposed between the semi-reflective layer and the reflective layer.

7. The storage medium of claim 6, further comprising another reactive layer disposed between the semi-reflective layer and the control portion.

8. The storage medium of claim 1, wherein the light absorbing material has at least one of an absorbance ratio at (600 nm to 365 nm) or (600 nm to 400 nm) of greater than or equal to about 5.

9. The storage medium of claim 8, wherein at least one of an absorbance ratio at (600 nm to 365 nm) or (600 nm to 400 nm) is greater than or equal to about 10.

10. The storage medium of claim 1, further comprising a data layer disposed on a side of the reactive layer opposite the control portion.

11. The storage medium of claim 1, wherein the reactive layer further comprises a carrier, a reactive material and a polyhydroxy compound.

12. The storage medium of claim 1, wherein the polymeric resin comprises polycarbonate.

13. The storage medium of claim 1, wherein the medium, when the reactive layer has been oxidized, has the property of being unplayable after greater than or equal to about 20 hrs of accelerated weathering.

14. The storage medium of claim 13, wherein the medium, when the reactive layer has been oxidized, has the property of being unplayable after greater than or equal to about 40 hrs of accelerated weathering.

15. The storage medium of claim 14, wherein the medium, when the reactive layer has been oxidized, has the property of being unplayable after greater than or equal to about 80 hrs of accelerated weathering.

16. The storage medium of claim 1, wherein the light absorbing material is present in an amount of about 0.01 wt % to about 1 wt %, based upon the total weight of the control portion.

17. The storage medium of claim 16, wherein the light absorbing material is present in an amount of about 0.1 wt % to about 0.40 wt %, based upon the total weight of the control portion.

18. The storage medium of claim 1, wherein the control portion has a filtration index greater than or equal to about 4.0.

19. The storage medium of claim 18, wherein the control portion has a filtration index greater than or equal to about 6.

20. The storage medium of claim 18, wherein the control portion has a curing index greater than or equal to about 0.5.

21. The storage medium of claim 1, wherein the control portion has a curing index greater than or equal to about 0.5.

22. The storage medium of claim 21, wherein the control portion has a curing index greater than or equal to about 5.

23. The storage medium of claim 1, wherein the light absorbing material is selected from the group consisting of an anthraquinone derivative, a benzopyran derivative, a vat violet dye, and combinations comprising at least one of these light absorbing materials.

24. The storage medium of claim 23, wherein the light absorbing material comprises the anthraquinone derivative selected from the group consisting of 1,4-, 1,5- and 1,8-anthraquinone derivatives, and a combination comprising at least one of the foregoing anthraquinone derivatives, having a Formula (IX), (X) and (XI) respectively

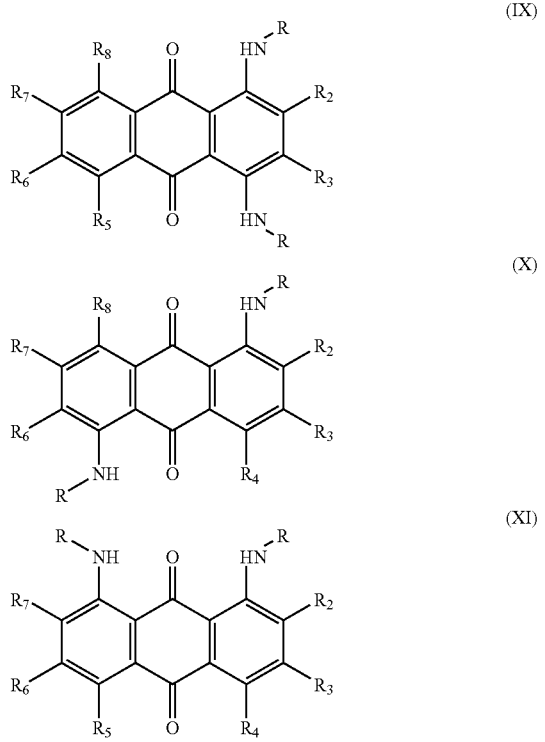

wherein $R_1$–$R_7$ are, individually, selected from the group consisting of a hydrogen atom, a hydroxyl group, an aliphatic group, an aromatic group, a heterocyclic group, a halogen atom, a cyano group, a nitro group, —$COR_9$, —$COOR_9$, —$NR_9R_{10}$, —$NR_{10}COR_{11}$, —$NR_{10}SO_2R_{11}$, —$CONR_9R_{10}$, —$CONHSO_2R_{11}$, and —$SO_2NHCOR_{11}$; in which $R_9$ and $R_{10}$ are, individually, selected from the group consisting of a hydrogen atom, an aliphatic group, an aromatic group, and a heterocyclic group; wherein $R_{11}$ is selected from the group consisting of an aliphatic group, an aromatic group, and a heterocyclic group; and wherein R is selected from the group consisting of hydrogen, an alkyl group containing 1 to 20 carbon atoms, a cycloalkyl group containing 3 to 20 carbon atoms, an allyl group containing 3 to 20 carbon atoms, a hydroxyl group, a cyano group, a nitro group, a carboxylic acid, an aryl group containing 6 to 10 carbon atoms, an amino group containing less than or equal to 20 carbon atoms, an amido group containing 1 to 20 carbon atoms, a carbamoyl group containing 1 to 20 carbon atoms, an ester group containing 2 to 20 carbon atoms, an alkoxy or aryloxy group containing 1 to 20 carbon atoms, a sulfonamido group containing 1 to 20 carbon atoms, a sulfamoyl group containing less than or equal to 20 atoms, a 5-membered heterocyclic ring, and a 6-membered heterocyclic ring.

25. The storage medium of claim 24, wherein the light absorbing material comprises the 1,8-anthraquinone derivatives having the Formula (XI).

26. The storage medium of claim 25, wherein the light absorbing material comprises 1,8 bis(cyclohexylamino) anthraquinone.

27. The storage medium of claim 25, wherein the light absorbing material comprises 1,8-dialkylamino anthraquinone.

28. The storage medium of claim 25, wherein the light absorbing material is present in an amount of about 0.1 wt % to about 0.4 wt %, based upon the total weight of the control portion.

29. The storage medium of claim 23, wherein the light absorbing material comprises the benzopyran derivative having a Formula (XII)

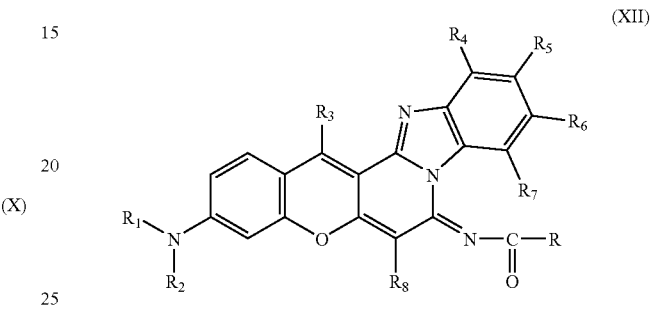

where R is an unsubstituted or substituted aryl group, $R_8$ is selected from the group consisting of alkoxycarbonyl, nitro, cyano, alkylsulfonyl, benzimidazolyl, benzothiazolyl, benzoxazolyl, or quinoxalinyl; $R_1$ and $R_2$ are, independently selected from the group consisting of hydrogen, unsubstituted or substituted alkyl groups, wherein the substitution is selected from the group consisting of $C_1$–$C_{15}$ monovalent hydrocarbyl, alkoxy, cyano, halo, carboxyl, and carbalkoxy.

30. The storage medium of claim 23, wherein the light absorbing material comprises the vat violet dye having the Formula (XIV)

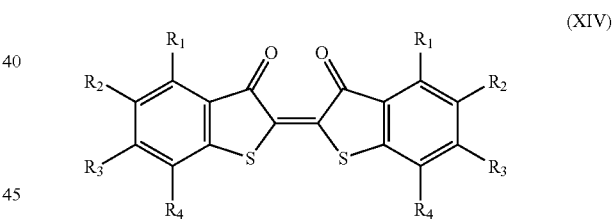

where $R_1$, $R_2$, $R_3$ and $R_4$, are, individually, selected from the group consisting of hydrogen, halogen, alkyl, aryl, alkoxy, alcoyl, amide, alcohol, nitrile, nitro, ester, and ether.

31. The storage medium of claim 23, wherein the anthraquinone derivative of Formula (XV)

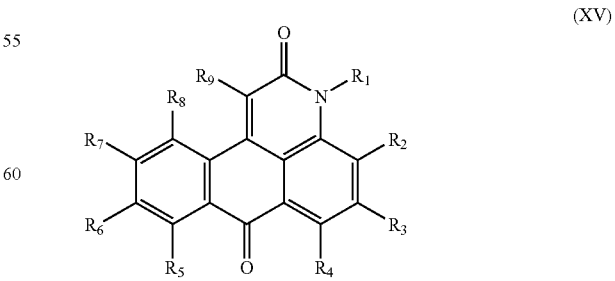

wherein $R_1$ is selected from the group consisting of hydrogen, an aliphatic group, an aromatic group, and a heterocyclic group; $R_2$, $R_3$, $R_4$, $R_5$, $R_6$, $R_7$, $R_8$, and $R_9$ are, individually, selected from the group consisting of hydrogen, an alkyl group having 1 to 20 carbon atoms, a cycloalkyl group having 3 to 20 carbon atoms, an allyl group having 3 to 20 carbon atoms, a hydroxyl group, a cyano group, a nitro group, a carboxylic acid, an aryl group having 6 to 10 carbon atoms, an amino group having less than or equal to 20 carbon atoms, an amido group having 1 to 20 carbon atoms, a carbamoyl group having 1 to 20 carbon atoms, an ester group having 2 to 20 carbon atoms, an alkoxy or aryloxy group having 1 to 20 carbon atoms, a sulfide group having 1 to 20 carbon atoms, a sulfonamido group having 1 to 20 carbon atoms, a sulfamoyl group having less than or equal to 20 atoms, a 5-membered heterocyclic ring, and a 6-membered heterocyclic ring; and wherein at least one group of $R_1$ $R_2$, $R_3$, $R_4$, $R_5$, $R_6$, $R_7$, $R_8$, and $R_9$ is different from a hydrogen atom.

32. The storage medium of claim 31, wherein the light absorbing material is present in an amount of about 0.1 wt % to about 0.4 wt %, based upon the total weight of the control portion.

33. The storage medium claim 1, wherein the control portion has a transmissivity of less than or equal to about 0.1% at a wavelength of 550 nm.

34. The storage medium claim 1, wherein the storage medium is a DVD.

35. The storage medium claim 1, further comprising another control portion disposed on a side of the reflective layer opposite the reactive layer.

36. A method for manufacturing a limited play optical storage medium, comprising:
combining a polymeric resin and a light absorbing material to form a control composition;
forming the control composition into a control portion having a light transmission of greater than or equal to about 70% at 650 run, a curing index of greater than or equal to about 0.1 and a filtration index of greater than or equal to about 2.5, and wherein the light absorbing material has a minimum extinction coefficient (measured in $CH_2Cl_2$ solution) at 600 nm of greater than or equal to 1,500 $mol^{-1} \cdot cm^{-1} \cdot L$, a maximum extinction coefficient (measured in $CH_2Cl_2$ solution) at 650 nm of less than about 1,000 $mol^{-1} \cdot cm^{-1} \cdot L$, a ratio of extinction coefficient at 650 nm to 600 nm less than about 0.1; and
disposing a reflective layer and a reactive layer on a side of the control portion wherein the reactive layer is disposed between the control portion and the reflective layer, and wherein the reactive layer is designed to limit the time during which data on the medium (disposed on a side of the reactive layer opposite the control portion) can be accessed after exposure to oxygen.

37. The method of claim 36, further comprising disposing a substrate on a side of the reflective layer opposite the control portion.

38. The method of claim 37, further comprising disposing a semi-reflective layer between the reflective layer and the control portion.

39. The method of claim 37, further comprising disposing the reactive layer between the semi-reflective layer and the reflective layer.

40. The method of claim 39, further comprising disposing another reactive layer between the semi-reflective layer and the control portion.

41. The method of claim 36, further comprising disposing data on a side of a control portion opposite the reactive layer.

42. A limited play optical storage medium for data, comprising:
a reflective layer;
a control portion comprising an optically transparent polymeric resin and a light absorbing material, wherein the control portion has a light transmission of greater than or equal to about 70% at 650 nm initially, wherein the light transmission decreases from the initial light transmission at 650 nm, after 160 hrs accelerated weathering, by greater than or equal to about 5%; and
a reactive layer disposed between the reflective layer and the control portion, wherein the reactive layer is designed to limit the time during which data on the medium (disposed on a side of the reactive layer opposite the control portion), can be accessed after exposure to oxygen.

43. The storage medium of claim 42, wherein the light transmission decreases after 160 hours of accelerated weathering of greater than or equal to about 10%.

44. The storage medium of claim 42, wherein the light transmission decreases after 80 hours of accelerated weathering of greater than or equal to about 2%.

45. The storage medium of claim 44, wherein the light transmission decreases after 80 hours of accelerated weathering of greater than or equal to about 5%.

46. The storage medium of claim 45, wherein the light transmission decreases after 80 hours of accelerated weathering of greater than or equal to about 10%.

* * * * *